United States Patent
Auradkar et al.

(10) Patent No.: US 9,165,154 B2
(45) Date of Patent: Oct. 20, 2015

(54) TRUSTED CLOUD COMPUTING AND SERVICES FRAMEWORK

(75) Inventors: Rahul V. Auradkar, Sammamish, WA (US); Roy Peter D'Souza, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 321 days.

(21) Appl. No.: 12/490,837

(22) Filed: Jun. 24, 2009

(65) Prior Publication Data

US 2010/0211781 A1  Aug. 19, 2010

Related U.S. Application Data

(60) Provisional application No. 61/152,957, filed on Feb. 16, 2009.

(51) Int. Cl.
| | |
|---|---|
| G06F 11/30 | (2006.01) |
| G06F 21/62 | (2013.01) |
| H04L 9/08 | (2006.01) |
| H04L 9/32 | (2006.01) |

(52) U.S. Cl.
CPC ........ *G06F 21/6218* (2013.01); *G06F 21/6209* (2013.01); *H04L 9/0866* (2013.01); *H04L 9/3271* (2013.01); *G06F 2221/2101* (2013.01); *H04L 2209/42* (2013.01); *H04L 2209/60* (2013.01); *H04L 2209/80* (2013.01)

(58) Field of Classification Search
CPC ..................... G06F 21/6218; G06F 2221/2101
USPC .......................................................... 726/22
See application file for complete search history.

(56) References Cited

U.S. PATENT DOCUMENTS

| | | |
|---|---|---|
| 5,721,777 A | 2/1998 | Blaze |
| 7,113,594 B2 | 9/2006 | Boneh |
| 7,349,538 B2 | 3/2008 | Gentry |
| 7,484,092 B2 | 1/2009 | Rajasekaran |

(Continued)

FOREIGN PATENT DOCUMENTS

| | | |
|---|---|---|
| JP | 2004-222007 | 8/2004 |
| JP | 2004-234344 A | 8/2004 |

(Continued)

OTHER PUBLICATIONS

Ateniese, provable data possession at untrusted stores, 2007, Retrieved from the Internet <URL: dl.acm.org/citation.cfm?id=1315318>, pp. 1-13 as printed.*

(Continued)

*Primary Examiner* — Michael Chao
(74) *Attorney, Agent, or Firm* — Timothy Churna; Kate Drakos; Micky Minhas

(57) ABSTRACT

A digital escrow pattern is provided for network data services including searchable encryption techniques for data stored in a cloud, distributing trust across multiple entities to avoid a single point of data compromise. In one embodiment, a key generator, a cryptographic technology provider and a cloud services provider are each provided as separate entities, enabling a publisher of data to publish data confidentially (encrypted) to a cloud services provider, and then expose the encrypted data selectively to subscribers requesting that data based on subscriber identity information encoded in key information generated in response to the subscriber requests, e.g., a role of the subscriber.

21 Claims, 33 Drawing Sheets

(56) References Cited

U.S. PATENT DOCUMENTS

| | | | |
|---|---|---|---|
| 2002/0112162 A1 | 8/2002 | Cocotis et al. | |
| 2003/0105688 A1 | 6/2003 | Brown | |
| 2004/0010699 A1* | 1/2004 | Shao et al. | 713/189 |
| 2004/0179684 A1 | 9/2004 | Appenzeller | |
| 2005/0251680 A1 | 11/2005 | Brown | |
| 2007/0005594 A1* | 1/2007 | Pinkas et al. | 707/6 |
| 2007/0055887 A1 | 3/2007 | Cross | |
| 2007/0150596 A1 | 6/2007 | Miller | |
| 2008/0066185 A1 | 3/2008 | Lester | |
| 2008/0075281 A1 | 3/2008 | Zeng | |
| 2008/0080718 A1 | 4/2008 | Meijer | |
| 2008/0083025 A1 | 4/2008 | Meijer | |
| 2008/0083036 A1 | 4/2008 | Ozzie | |
| 2008/0091613 A1 | 4/2008 | Gates | |
| 2008/0104699 A1 | 5/2008 | Gounares | |
| 2008/0133935 A1* | 6/2008 | Elovici et al. | 713/193 |
| 2008/0267394 A1 | 10/2008 | Nan | |
| 2009/0010436 A1 | 1/2009 | Fuhr | |
| 2009/0113213 A1* | 4/2009 | Park et al. | 713/189 |
| 2010/0095115 A1 | 4/2010 | Murray | |
| 2010/0211782 A1 | 8/2010 | Auradkar | |

FOREIGN PATENT DOCUMENTS

| | | |
|---|---|---|
| JP | 2005-500740 | 1/2005 |
| JP | 2007-507175 | 3/2007 |
| JP | 2008-506317 | 2/2008 |
| WO | 03017559 | 2/2003 |
| WO | 2005032028 A2 | 4/2005 |
| WO | 2005032038 | 4/2005 |
| WO | 2006007601 | 1/2006 |

OTHER PUBLICATIONS

Casassa, IBE Applied to Privacy and Identity Management, 2003, Retrieved from the Internet <URL: citeseerx.ist.psu.edu/viewdoc/download?doi=10.1.1.14.2209&rep=rep1&type=pdf>, pp. 1-14 as printed.*
Boneh et al., Public Key encryption with Keyword Search, 2004, Retrieved from the internet <URL: springerlink.com/content/0hafhrbbvt217vn3/>, pp. 1-17 as printed.*
Kamara, Computing Securely with Untrusted Resources, 2008, Retrieved from the Internet <URL: web.archive.org/web/20081002131310/http://www.cs.umd.edu/~jkatz/THESES/seny-thesis.pdf>, pp. 1-149 as printed.*
Juels et al., PORs: Proofs of Retrievability for Large Files, 2007, Retrieved from the Internet <URL: http://dl.acm.org/citation.cfm?id=1315317>, pp. 1-14 as printed.*
(author not stated by reference) Dan Suciu; CSE 544: Lecture 10 Theory; 2004; Retrieved from the Internet <URL: http://courses.cs.washington.edu/courses/cse544/04sp/>; pp. 1-6 as printed.*
Second Office Action, Chinese Patent Application No. 201080008658.7, dated Sep. 13, 2012, 7 pages (including English translation).
Amendment, Chinese Patent Application No. 201080008658.7, dated Sep. 28, 2012, 9 pages. (including English translation of claims).
Chinese Patent Application No. 201080008655.3, Amendment dated Dec. 20, 2013, 13 pages, including English translation of claims.
Third Office Action, Chinese Patent Application No. 201080008658.7, dated Oct. 22, 2012, 6 pages (including English translation).
Amendment, Chinese Patent Application No. 201080008658.7, dated Nov. 5, 2012, 8 pages (including English translation of claims).
PCT Application No. PCT/US2010/023239, International Search Report mailed Sep. 9, 2010, 8 pages.
U.S. Appl. No. 61/152,957, filed Feb. 16, 2009, 85 pages.
Amendment, Chinese Patent Application No. 201080008658.7, dated Aug. 28, 2012, 11 pages. (including English translation of claims).
Office Action, Chinese Patent Application No. 201080008658.7, dated Jun. 7, 2012, 7 pages.
Mont, IBE Applied to Privacy and Identity Management, 2003, 14 pages.
Cyril Guyot, "Securing Stored Data in the Cloud", Hitachi Global Storage Technologies, dated Jan. 30, 2009, 36 pages.
Saeed Sedghi, et al., "Towards an Information Theoretic Analysis of Searchable Encryption (Extended Version)", 2008, 19 pages.
Dong Jin Park, et al., "Searchable Keyword-Based Encryption", 2005, 13 pages.
Joonsang Baek, "A Survey of Identity-Based Cryptography", 2004, 10 pages.
"Security for Cloud-Based Enterprise Applications", http://blog.dt.org/index.php/2009/02/security-for-cloud-based-enterprise-applications/ last viewed on Mar. 13, 2009, 5 pages.
"Key Management is Crucial to Cloud Computing: Dunkelberger", http://www.securecomputing.net.au/News/129030, key-management-is-crucial-to-cloud-computing-dunkelberger.aspx last viewed on Mar. 13, 2009, 2 pages.
"Cloud Computing and User Authentication", MicrosoftSoCalArchitectBlog, http://blogs.msdn.com/socalarchitect/archive/2008/08/19/cloud-computing-and-user-authentication.aspx last viewed on Mar. 13, 2009, 2 pages.
PCT Application No. PCT/US2010/023243, International Search Report mailed Sep. 15, 2010, 8 pages.
U.S. Appl. No. 12/491,403, Notice of Allowance, mailed Aug. 29, 2012, 14 pages.
U.S. Appl. No. 12/491,403, Amendment filed Jun. 22, 2012, 19 pages.
U.S. Appl. No. 12/491,403, Non-Final Rejection mailed Feb. 23, 2012, 13 pages.
U.S. Appl. No. 12/491,403, Amendment filed Dec. 27, 2012, 21 pages.
U.S. Appl. No. 12/491,403, Non-Final Rejection mailed Sep. 26, 2012, 14 pages.
Notice on Re-examiantion, Chinese Patent Application No. 201080008658.7, dated Aug. 19, 2013, 7 pages (including English translation).
Notice of Re-examiantion, Chinese Patent Application No. 201080008658.7, dated Aug. 19, 2013, 2 pages (including English translation).
Notice of First Office Action, Chinese Patent Application No. 201080008655.3, dated Aug. 5, 2013, 9 pages, including English translation.
Boneh, Dan, et al., "Public Key Encryption with Keyword Search", 2004, 15 pages.
Bellare, Mihir, et al., "Deterministic and Efficiently Searchable Encryption", 2007, 18 pages.
Abdalla, Michel, et al., "Searchable Encryption Revisited: Consistency Properties, Relation to Anonymous IBE, and Extensions", 17 pages, 2005.
Final Office Action, Chinese Patent Application No. 201080008658.7, dated Nov. 28, 2012, 5 pages. (including English translation).
Request for Reexamination Chinese Patent Application No. 201080008658.7, dated Mar. 8, 2013, 8 pages.
Japanese Patent Application No. 2011-550169, Office Action dated Jan. 16, 2014, 7 pages.
Japanese Patent Application No. 2011-550169, English translation of Office Action dated Jan. 16, 2014, 8 pages.
Machine translation of JP 2004-234344, 11 pages.
Machine translation of JP 2004-222007, 16 pages.
"Final Rejection Received in Japanese Patent Application No. 2011-550169", Mailed Date: May 1, 2014, Filed Date: Feb. 4, 2010, 4 Pages. (MS# 327099.06).
Japanese Patent Application No. 2011-550170, Office Action mailed Jan. 16, 2014, 4 pages.
Japanese Patent Application No. 2011-550170, Office Action mailed Jan. 16, 2014, 5 pages (English translation).
Japanese Patent Application No. 2011-550170, Amendment filed Apr. 16, 2014, 11 pages.
Japanese Patent Application No. 2011-550170, filed claims on Apr. 16, 2014, 3 pages (English translation).

(56) References Cited

OTHER PUBLICATIONS

Chinese Patent Application No. 201080008655.3, Amendment dated Jul. 9, 2014, 12 pages including English translation of amended claims.

Japanese Patent Application No. 2011-550170, Final Rejection mailed May 9, 2014, 2 pages.

Japanese Patent Application No. 2011-550170, Final Rejection mailed May 9, 2014, 2 pages (English Translation).

Japanese Patent Application No. 2011-550169, Amendment dated Apr. 8, 2014, 8 pages (including English translation of pending claims).

Chinese Patent Application No. 201080008655.3, Office Action dated Apr. 24, 2014, 13 pages (including English Translation).

Chinese Patent Application No. 201080008655.3, Notice of Grant of Patent Right for Invention, dated Aug. 5, 2014, 4 pages including English translation.

Chinese Patent Application No. 201080008655.3, Patent Certificate, dated Oct. 14, 2014, 3 pages including English translation.

* cited by examiner

TRUSTED CLOUD COMPUTING AND SERVICES FRAMEWORK

CROSS REFERENCE TO RELATED APPLICATIONS

The present application claims priority to U.S. Provisional Application No. 61/152,957, filed Feb. 16, 2009, entitled "TRUSTED CLOUD COMPUTING AND SERVICES FRAMEWORK", the entirety of which is incorporated herein by reference.

TECHNICAL FIELD

The subject disclosure relates to providing a framework for trusted cloud computing and data services for participant(s), and corresponding scenarios based on the framework.

BACKGROUND

By way of background concerning some conventional systems, computing devices have traditionally executed applications and data services locally to the device. In such case, as data is accessed, processed, stored, cached, etc., the data may travel on the device over local buses, interfaces and other data pathways, however, the user of the device has not had to worry about interference or exposure of user data unless the device itself is lost or stolen.

Yet, with the evolution of on-line and cloud services, applications and services are increasingly being moved to network providers who perform some or all of a given service on behalf of a user's devices. In such case, the user may become concerned with who can access, or potentially worse, interfere with, the user's data while it is uploaded to a service, while it is stored by the service or while it retrieved from the service. In short, when the data of a user's device leaves the domain of physical possession and enters a network environment away from the user, a concern over handling of the data once it leaves the physical possession of the user naturally develops. Accordingly, it is desirable to increase the trust for cloud services and the handling of data in connection with cloud services.

The above-described deficiencies of today's devices and cloud services are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

A digital escrow pattern is provided for network data services including searchable encryption techniques for data stored in a cloud, distributing trust across multiple entities to avoid a single point of data compromise. In one embodiment, a key generator, a cryptographic technology provider and a cloud services provider are each provided as separate entities, enabling a publisher of data to publish data confidentially (encrypted) to a cloud services provider, and then expose the encrypted data selectively to subscribers requesting that data based on subscriber identity information encoded in key information generated in response to the subscriber requests.

A set of scenarios with respect to the trusted cloud services ecosystem emerge and these scenarios and various other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
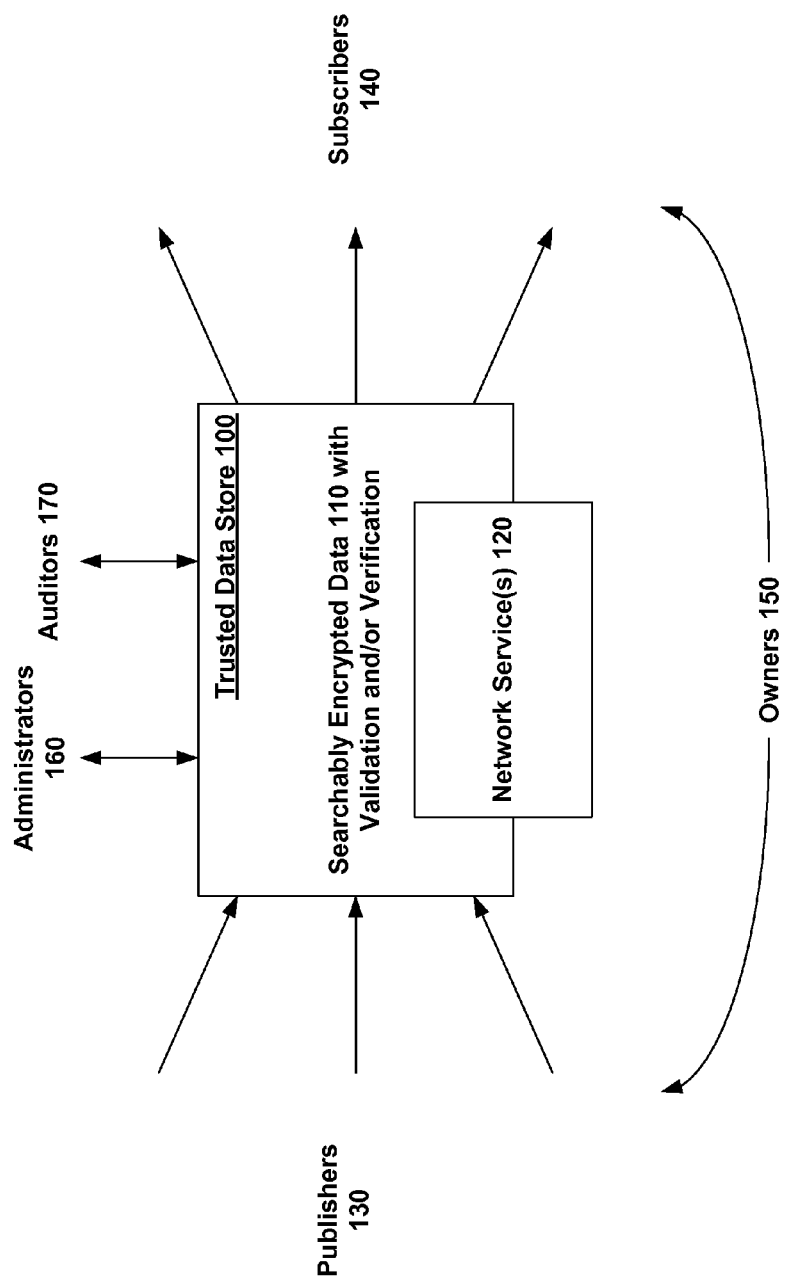
FIG. 1 is an exemplary non-limiting block diagram of a trusted cloud services framework or ecosystem in accordance with an embodiment.

As discussed in the background, data sent to a network service can create discomfort with respect to privacy, potential for tampering, etc., i.e., when data is transmitted from a user's device to a network application, service or data store, a user needs sufficient assurance that no malevolent third party can cause harm. By definition, the user has lost control over the data. It is thus desirable to increase trust so that publishers and/or owners of data are willing to surrender physical control over their data, trusting that their data will remain private, and inviolate, while in the network, except where the publishers or owners grant privileges to subscribers based on the identity of the subscribers.

In this regard, to eliminate the trust barriers that surround conventional provision of network services, a trusted cloud computing and data services ecosystem or framework is provided that achieves the above-identified objectives as well as other advantages highlighted in the various embodiments described below. The term "cloud" services generally refers to the notion that a service is performed not locally from a user's device, but rather delivered from one or more remote devices accessible via one or more networks. Since the user's device does not need to understand the details of what happens at the one or more remote devices, the service appears to be delivered from a "cloud" from the perspective of the user's device.

In one embodiment, a system comprises a key generator that generates key information for publishing or subscribing to data. A cryptographic technology provider, implemented independently from the key generator, implements searchable encryption/decryption algorithm(s) based on the key information generated by the key generator. In addition, a network service provider, implemented independently from the key generator and the cryptographic technology provider, provides a network service with respect to data encrypted by the cryptographic technology provider.

With respect to the searchable encryption/decryption algorithm(s), a searchable public key encryption (PEKS) scheme implemented by one or more cryptographic technology providers generates, for any given message W, a trapdoor TW, such that TW allows a check of whether a given ciphertext is an encryption of W or not, where TW does not reveal any additional information about the plaintext. In accordance with various embodiments described below, PEKS schemes can be used to prioritize or filter encrypted data, such as encrypted messages, based on keywords contained in the data, e.g., the message text. A data recipient can thus be given selected access to parts of the encrypted data relating to keyword(s) by releasing the capabilities (sometimes called "trapdoors" by cryptographers) for the corresponding keyword(s). This way, the encrypted data can be checked for these keywords, but there is assurance that nothing more will be learned from a subscriber than the subscriber's capabilities allow.

For the avoidance of doubt, while PEKS is disclosed as an algorithm for implementing searchable encryption in one or more embodiments herein, it can be appreciated that a variety of alternative algorithms exist for achieving searchable encryption. Some exemplary non-limiting alternatives to PEKS, for instance, include Oblivious RAMs. Thus, the terminology "Searchable Encryption" as used herein should not be limited to any one technique and thus refers to a wide range of encryption mechanisms or combination of encryption mechanisms that allow selective access of a subset of encrypted data based on search or query functionality over the encrypted data.

Optionally, validation and/or verification of results can be provided as an additional benefit to subscribers and publishers of data in the ecosystem. Validation provides a way of validating that the items of data received as a result of a subscription request for a subset of data is the correct set of items, i.e., that the correct subset of data that should have been received was in fact received. A technique in the cryptographic arts is proof of data possession (PDP); however, for the avoidance of doubt, PDP is just an example algorithm that can be implemented and that others that achieve the same or similar objectives can be used. Provable or Proof of Data Possession (PDP) is a topic about how to frequently, efficiently and securely verify that a storage server is faithfully storing its client's potentially large outsourced data. The storage server is assumed to be untrusted in terms of both security and reliability.

Verification of results provides an additional mechanism for checking that the contents of the items themselves, i.e., to ensure that the items received in connection with the subscription request were not tampered with by any unauthorized entity. An example of verification in the cryptographic arts is proof of data possession (PDP); however, for the avoidance of doubt, PDP is just an example algorithm that can be implemented and that others that achieve the same or similar objectives can be used. Another technique known in the cryptographic arts is proof of retrievability (POR); however, for the avoidance of doubt, POR is just an example algorithm that can be implemented and that others that achieve the same or similar objectives can be used. A POR is a compact proof by a service provider or data hoster (prover) to a client (verifier) that a target file F is intact, in the sense that the client can fully recover file F, and that no tampering has occurred.

As an additional option, the ecosystem can implement notions of anonymous credentials, whereby publishers can upload information about themselves in an anonymous way without exposing critical details, and subscribers can be limited by their capabilities so that they cannot be exposed or provided access to critical details uploaded by a publisher. In this way, a publisher or subscriber can interact with the system while exposing only as much information as they wish to third parties.

Conventional web services have been limited to static client server arrangements and statically defined user policy for accessing data of the web service. However, when many publishers and subscribers are contemplated according to constantly changing and evolving complex business and other relationships, such conventional web services model fail to be flexible or secure enough. Accordingly, in various embodiments, late binding is enabled such that publishers and/or owners of data and content can change access privileges to encrypted content based on who the subscriber(s) are, based on their capability(ies) and based on what they are looking for, e.g., based on the keyword(s) employed in a request for data. Thus, what a subscriber can selectively access changes dynamically consistent with changes to the access privileges by the publishers and/or owners, since subscriber capabilities are encoded in the key information provided by the key generator on the fly. Thus, subscriber privileges are defined for a given request at the time of key generation for the request, and thus always reflect current policy with respect to request from the subscriber.

In one embodiment, a data store is provided that exposes selectively accessible, e.g., searchable, encrypted data wherein at least one publisher publishes data representing resource(s) to the data store. Providing a division of the potential for abuse of trust, a first independent entity performs generating of cryptographic key information. A second independent entity in turn performs encrypting of the published data prior to storing based on the cryptographic key information generated by the first independent entity. A set of network or cloud services then selective access to the encrypted data for a given request to the network service based on late bound selected privileges granted by the publisher(s) or owner(s) of the resource(s).

In other embodiments, a data store stores selectively accessible encrypted data wherein subscriber(s) subscribes to a specified subset of the encrypted data. A first independent entity generates cryptographic key information based on identity information associated with the subscriber(s), and a second independent entity performs decrypting of the specified subset based on the cryptographic key information generated by the first independent entity. Network service(s) respond to requests by the subscriber(s) and provide selective access to the encrypted data based on late bound selected privileges granted by the publishers or owners of the specified subset.

In this respect, the terms publisher and subscriber generally refer to anyone that publishes or subscribes to data of a trusted cloud service, respectively. However, in practice, depending on the industry, field, or application of the trusted cloud services ecosystem and digital escrow pattern, publishers and subscribers will take on more specific roles. For instance, an auditor of an encrypted data store may have certain capabilities based on the role of auditor, such as the capability to identify certain offensive keywords in an email store, but prohibited from reading email that does not contain the offensive keywords.

Similarly, an administrator of a server of a trusted cloud service can be permitted to observe the log of activity and data transactions handled by the server, but can also be restricted from seeing any customer names or credit card information. The identity of the subscriber can thus be the basis for limiting the kind of data the subscriber can access.

Various non-limiting embodiments of a trusted ecosystem are presented herein in the context of building trust for a cloud service; however, the trust building of the ecosystem provided herein is much more general, and not limited to application to cloud services. Rather, the embodiments described herein are similarly applicable to different servers or participants within enterprise data centers. Thus, while the data may never leave a given entity, the techniques for building trust as described herein are equally applicable where different processes within an enterprise operate within separate regions of control. Without visibility across all enterprise processes, similar mistrust issues can develop as if the participants were external to the enterprise. For instance, a Server could be breached within the enterprise, even though it is in the control of the administrator, or the administrator could be careless or malicious.

In addition to applying to encrypted data in the cloud, the various techniques of the subject disclosure can also apply to data stored on a laptop or other portable device, since the laptop may be lost or stolen. In such a case, the device could end up in the possession of an overly curious or malicious entity; however, the same techniques described herein that apply to protecting data in the cloud can also be applied to protect data on servers or laptops. If the local data is encrypted, without proper subscriber credentials, a thief will not be able to understand the local encrypted data being able to show no proper role or capabilities to access the data.

Further details of these and other various exemplary, non-limiting embodiments and scenarios are provided below.

Trusted Cloud Services Ecosystem

As mentioned, a digital escrow pattern is provided for network data services including searchable encryption techniques for data stored in a cloud, distributing trust across multiple entities to avoid compromise by a single entity. In one embodiment, a key generator, a cryptographic technology provider and a cloud services provider are each provided as separate entities, enabling a publisher of data to publish data confidentially (encrypted) to a cloud services provider, and then expose the encrypted data selectively to subscribers requesting that data based on subscriber identity information encoded in key information generated in response to the subscriber requests.

FIG. 1 is a block diagram of a trusted cloud services framework or ecosystem in accordance with an embodiment. The system includes a trusted data store 100 for storing searchably encrypted data 110 with the results of subscriber requests being subject to validation and/or verification. In this regard, network services 120 can be built on top of the secure data 110 such that the publishers of the data retain control over the capabilities granted to subscribers 140 who request the data, e.g., via network service(s) 120. Publishers 130 can also be subscribers 140, and vice versa, and owners 150 of the data can be either publishers 130 and/or subscribers 140 as well. As an example of some common roles and corresponding sets of capabilities that can be defined, a specialized kind of publishers 130 and subscribers 140 are administrators 160 and auditors 170.

For instance, administrators 160 can be a specialized set of permissions over data 110 to help maintain the operation of trusted data store 100, and auditor entities 170 can help maintain the integrity of certain data within scope of the audit. For instance, an auditor 170 could subscribe to messages of data 110 containing offensive keywords in which case the auditor 170, if permitted according to capabilities granted, would be alerted when messages of data 110 contained such offensive keywords, but unable to read other messages. In this regard, a myriad of scenarios can be built based on the ability to place publisher data into digital escrow such that keys can be handed out enabling selective access to that data.

For instance, a publisher authenticates to the ecosystem and indicates a set of documents to upload to the ecosystem. The documents are encrypted according to a searchable encryption algorithm based on cryptographic key information received from a separate key generator that generates the cryptographic key information. Then, the encrypted data is transmitted to a network service provider for storage of the encrypted data such that the encrypted data is selectively accessible according to late binding of selected privileges granted to a requesting device based on identity information of the requesting device. Separating the cryptographic technology provider from the storage of the encrypted data additionally insulates the encrypted data from further compromise.

Figure 2:
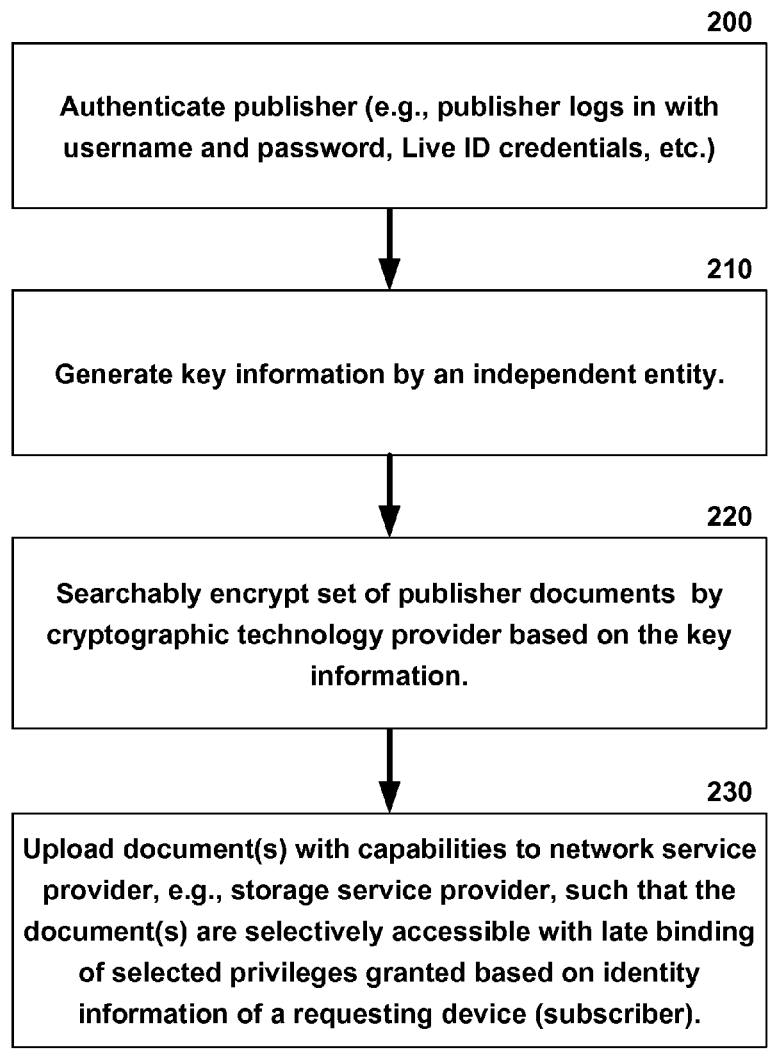
FIG. 2 is a flow diagram illustrating an exemplary non-limiting process for publishing data according to a trusted cloud services ecosystem.

In this regard, FIG. 2 is a flow diagram illustrating an exemplary non-limiting method for publishing data according to the trusted cloud services ecosystem. At 200, a publisher authenticates to the system (e.g., publisher logs in with username and password, Live ID credentials, etc.). At 210, key information is generated by key generator, such as a center for key generation as described in one or more embodiments below. At 220, a separate cryptographic technology provider encrypts a set of publisher documents based on the key information. At 230, the encrypted documents are uploaded with capabilities to network service provider, e.g., storage service provider, such that the encrypted document(s) are selectively accessible with late binding of selected privileges granted based on identity information of a requesting device (subscriber).

On the subscriber side, for example, a subscriber authenticates to the ecosystem and indicates a request for a subset of data, e.g., a query for a subset of documents containing a given keyword or set of keywords. In response to a request for a subset of searchably encrypted data from at least one subscriber device, a key generation component generates cryptographic key information based on identity information associated with the subscriber device. Then, the subset of encrypted data is decrypted as a function of privileges granted the subscriber device as defined in the cryptographic key information.

Figure 3:
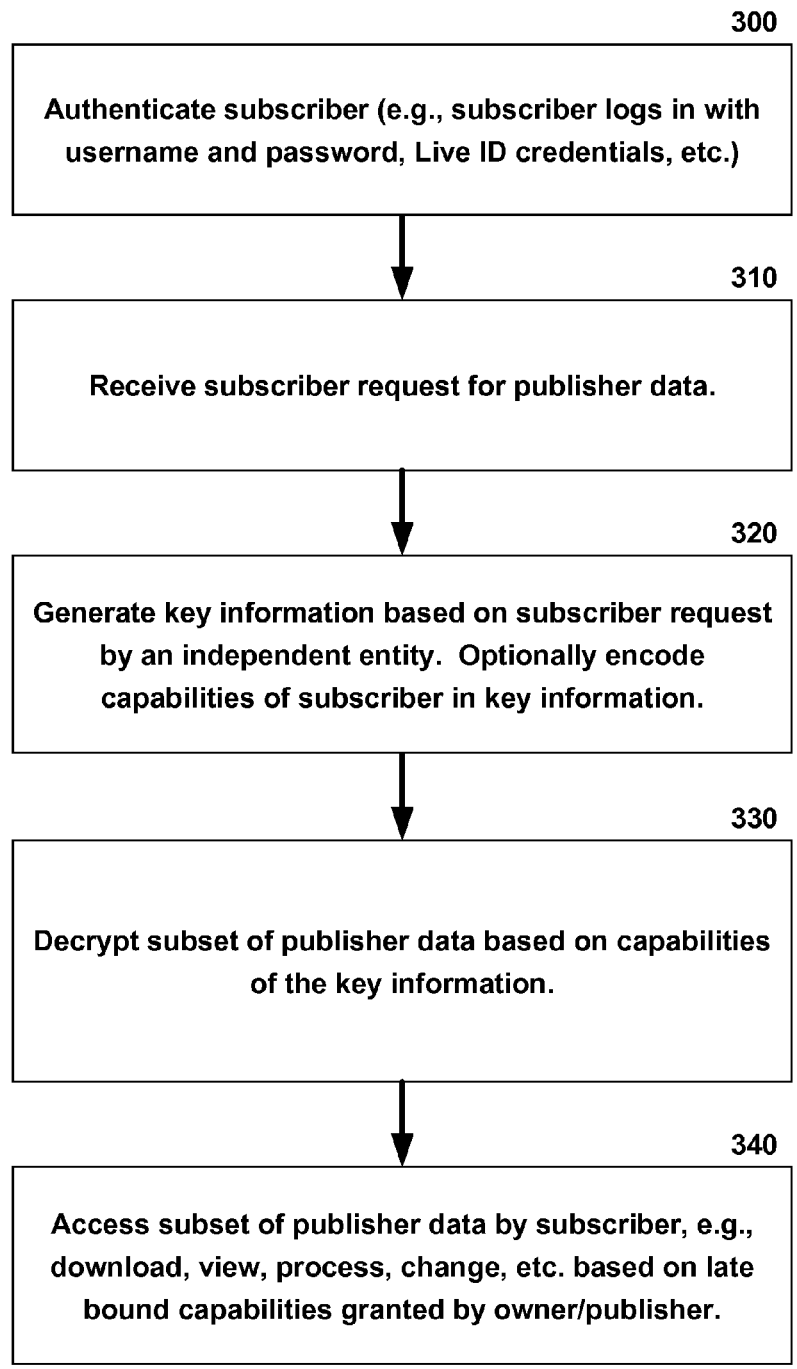
FIG. 3 is a flow diagram illustrating an exemplary non-limiting process for subscribing to data according to a trusted cloud services ecosystem.

FIG. 3 is a flow diagram illustrating an exemplary non-limiting method for subscribing to data according to the trusted cloud services ecosystem. At 300, a method for subscribing to data includes authenticating a subscriber (e.g., subscriber logs in with username and password, Live ID credentials, etc.). At 310, a subscriber makes a request for data. At 320, key information is generated by an independent key generation entity based on the subscriber request, where the capabilities of the subscriber can be defined in the key information. At 330, a subset of publisher data is decrypted based on the capabilities defined in the key information. For instance, the CSP can decrypt the data. At 340, the subset of publisher data is made accessible to the subscriber, e.g., the subscriber can download, view, process, change, etc. the data based on the dynamically definable capabilities granted by owner/publisher. Optionally, the technology used for encryption, decryption and key generation can be supplied by a separate cryptographic technology provider, but hosted by any participant.

In one embodiment, the identity information of the subscriber device includes a role of the subscriber. For instance, an auditor role, or administrator role, or other pre-specified role can be used by publishers/owners as a basis for restricting or granting access to various portions of the searchably encrypted data store.

Figure 4:
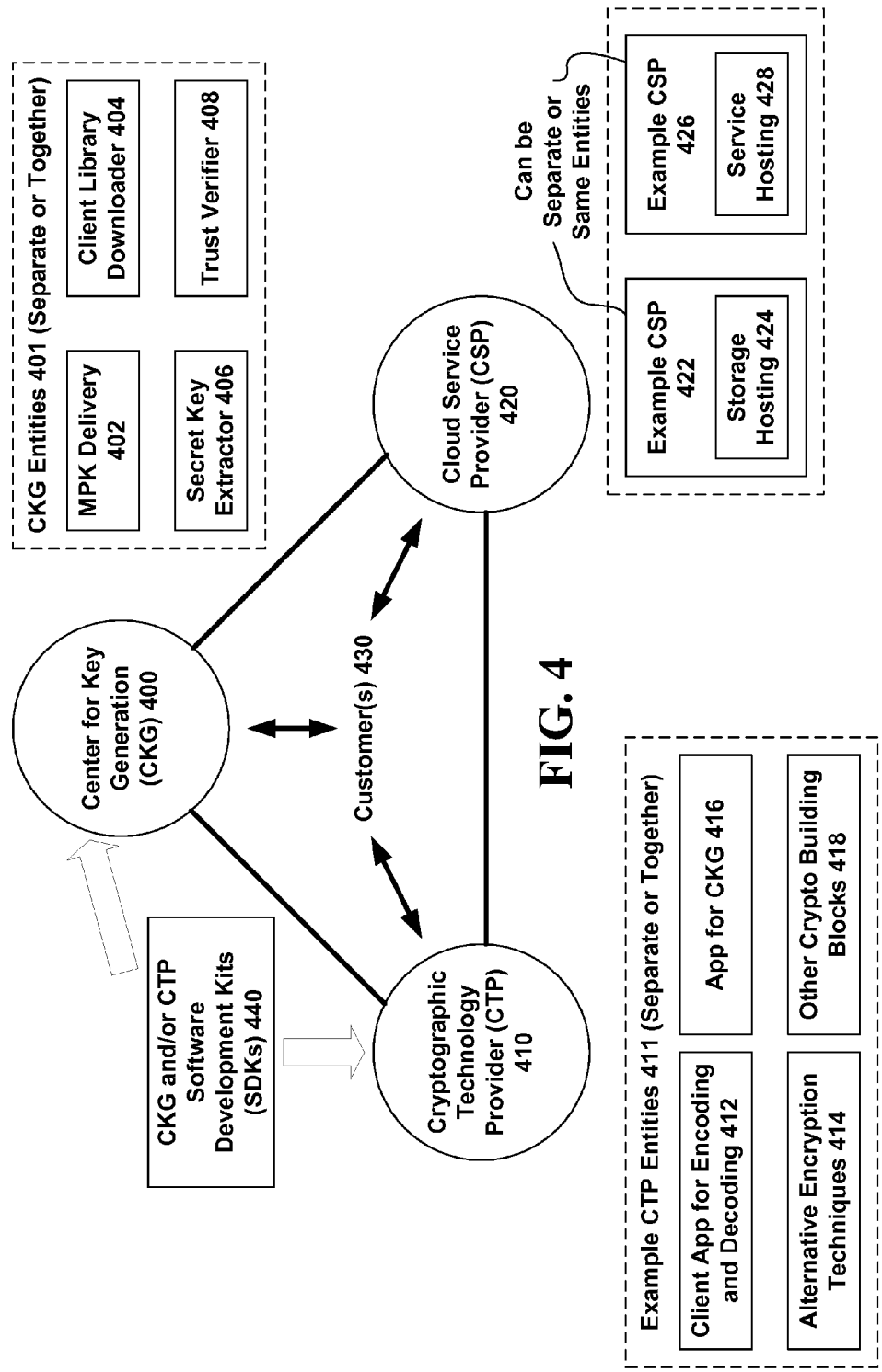
FIG. 4 illustrates an exemplary ecosystem showing the separation of center for key generation, cryptographic technology provider and cloud service provider 420 in a trusted ecosystem.

FIG. 4 illustrates an exemplary ecosystem showing the separation of center for key generation (CKG) 400, cryptographic technology provider (CTP) 410 and cloud service provider (CSP) 420 thereby eliminating the possibility of compromise by a single entity in the trusted ecosystem. In this regard, customer(s) 430 include publishers and/or subscribers of data. Optionally, CKG 400 can be built based on reference software, open source software, and/or a software development kit (SDK), e.g., provided by CTP 410, enabling the building blocks for parties to create such components by themselves, or be satisfied by third party implementations of such ecosystem components. In one embodiment, the SDK is provided by the CTP 410, and can be used by one or more participants to host or implement CKG 400, a compute and storage abstraction (CSA) described in more detail below and/or cryptographic client libraries. Optionally, the SDK can be distributed to the entity hosting the CKG 400 from CTP 410.

In general, each of CKG 400, CTP 410 or CSP 420 can be subdivided into subcomponents depending on a given implementation, however, the overall separation is preserved to maintain trust. For instance, CKG entities 401, such as master public key (MPK) delivery 402, client library downloader 404, secret key extractor 406, trust verifier 408, or other subcomponents, can be provided separately, in subsets, or together as an integrated component. CTP entities 411, such as client app for encoding and decoding 412, alternative encryption techniques 414, an application for interfacing with the CKG 416, other crypto building blocks 418, etc., can also be provided separately, in subsets or together. Moreover, CSP 420 can be thought of as many separate service providers, such as CSPs 422, 426 hosting storage service 424 and service hosting 428, respectively, or such services can be provided together.

It can be appreciated that the CKG, or CKG instance(s) hosted by one or more participants in the trusted ecosystem, is not required to be a single monolithic entity. Rather, the CKG can be separated into a number of (redundant) entities that cooperate to generate keys, so that operation can continue even if a small subset of the participants are offline. In one embodiment, optionally, a set of participants can be trusted in aggregate even if a small subset of these participants have been compromised by an adversary, or otherwise become unavailable or untrusted.

Figure 5:
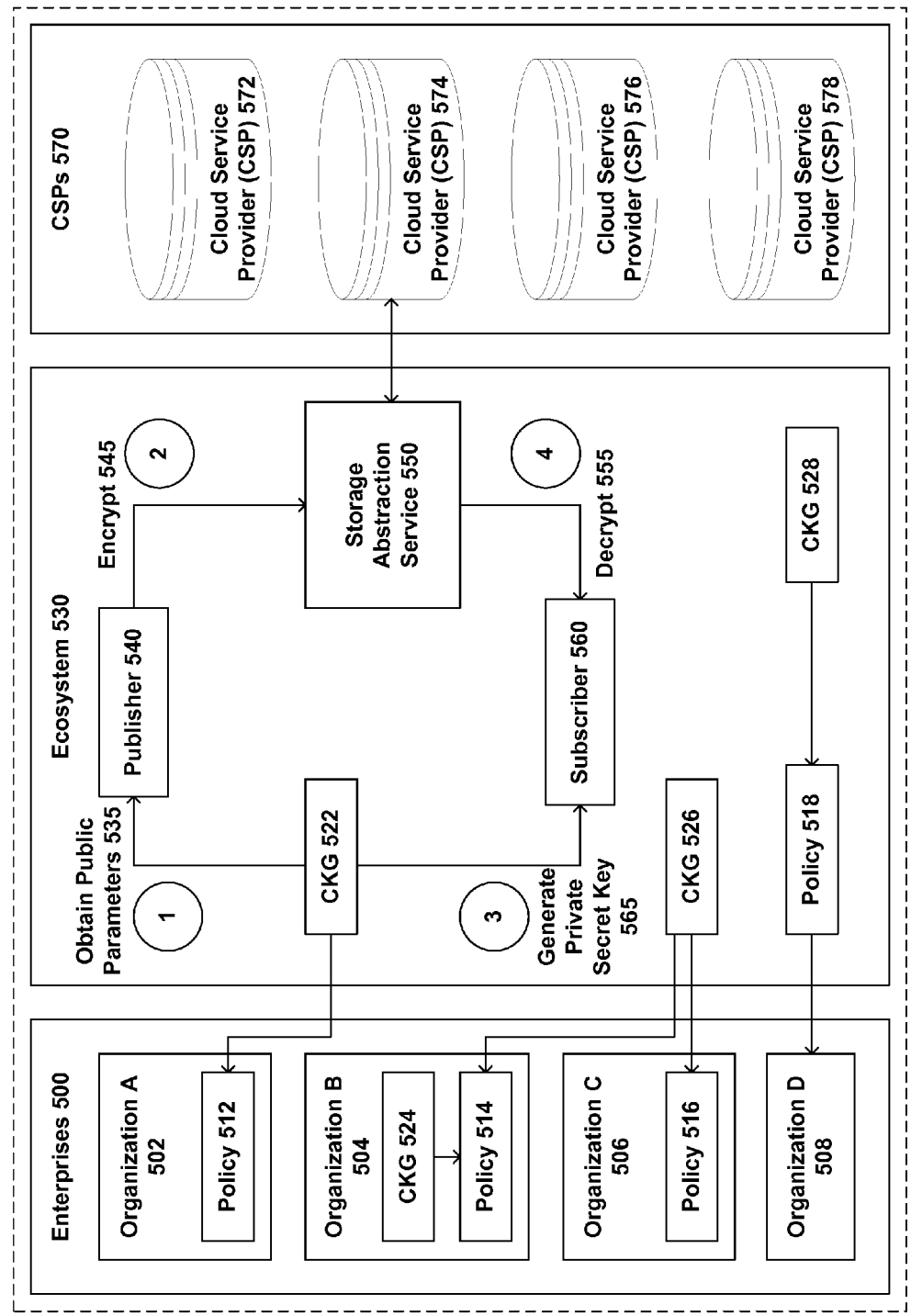
FIG. 5 is another architectural diagram illustrating further benefits of a trusted ecosystem for performing cloud services for enterprises.

FIG. 5 is another architectural diagram illustrating further benefits of a trusted ecosystem for performing cloud services for enterprises 500. For instance, enterprises 500 can include different organizations 502, 504, 506, 508. The different organizations 502, 504, 506, 508 in this diagram illustrate that organizations can take on as much or as little ownership with respect to implementing policy for using the system, or key generation. For instance, organization 502 implements its own policy 512, but uses a centralized key generator 522 whereas organization 504 chooses to implement its own key generator 524 and implement its own policy 514. Organization 506 also implements its own policy but relies on a third part CKG 526 whereas organization 508 chooses to rely on a third party policy provider 518 and an independent CKG 528.

In this regard, to publish data, a publisher 540 obtains public parameters for encrypting data 535 based on the output from CKG 522. Based on the public parameters, the data is encrypted by the publisher device 540 at 545 using an independent cryptographic technology provider. The encrypted data is uploaded to a storage abstraction service 550, which hides the storage semantics in connection with storing the encrypted data by one or more CSPs 570, such as CSPs 572, 574, 576, or 578. On the subscriber device 560, a request for data results in the generation of a private secret key 565 from CKG 522. The private secret key 565 includes information that enables the subscriber device 560 to selectively access the searchably encrypted data by decrypting the data at 555. Again, the semantics of retrieving the data from CSPs 570 is hidden by the storage abstraction service 550. Also, the privileges granted to the subscriber device 560 are the current set of privileges due to late binding of capabilities granted by publishers/owners.

It can be appreciated from FIG. 5 that multiple data owners, either enterprises or consumers, can participate in a trusted ecosystem as described herein to establish trusted relationships. In such case, each owner can host, or control their own CKG (e.g., CKG 524 of organization 504) so that requests or queries for data are forwarded to the corresponding CKGs to gather the necessary keys from all co-owners of the requested data.

Figure 6:
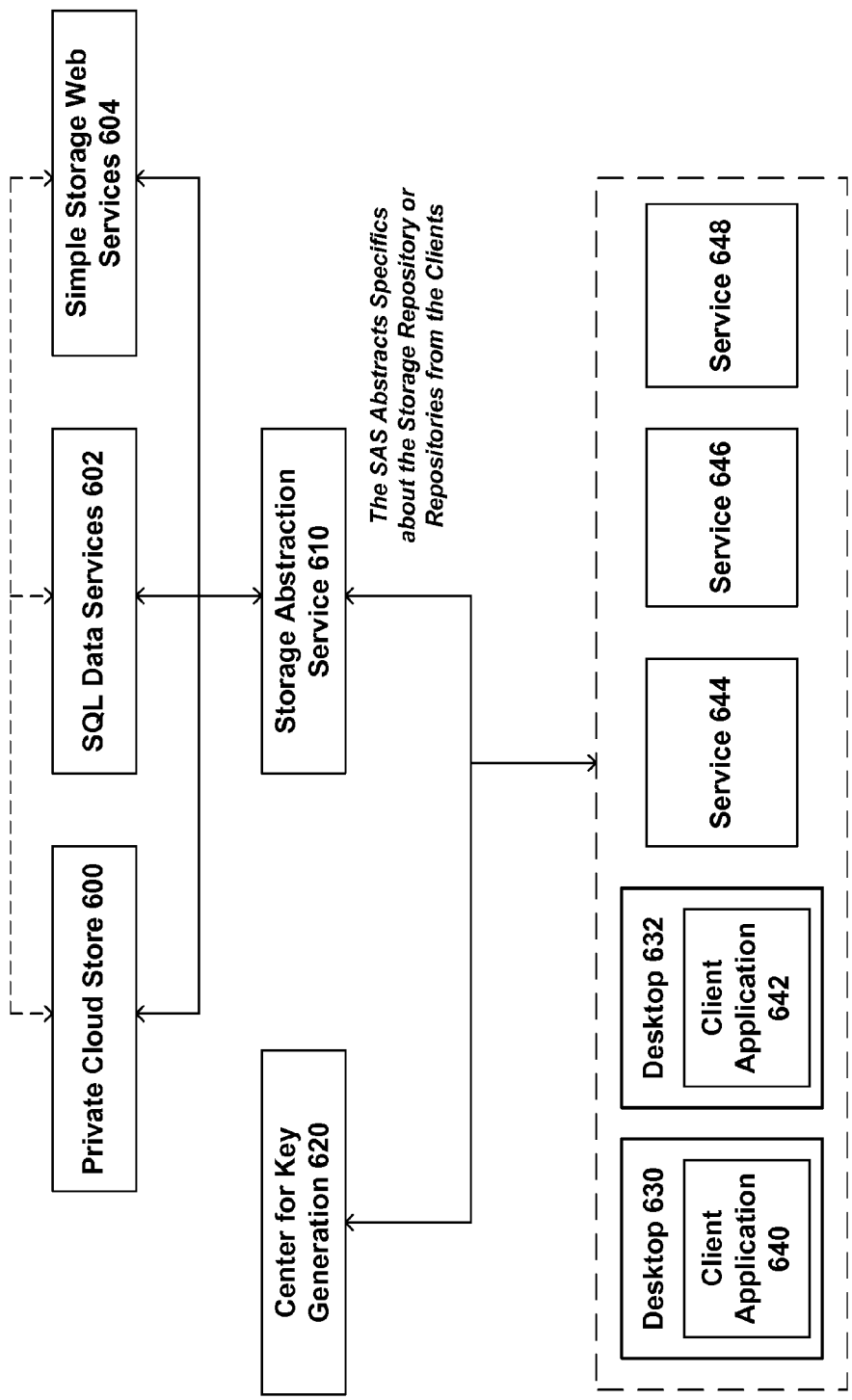
FIG. 6 is another block diagram illustrating the accommodation of different storage providers via a storage abstraction layer 610 according to a trusted cloud services ecosystem.

FIG. 6 is another block diagram illustrating the accommodation of different storage providers via a storage abstraction layer 610. With the trusted ecosystem, desktops 630, 632 having client applications 640, 642, respectively, may publish or subscribe to data as described above, initiating a request to the center for key generation 620 for key information for use in encrypting or decrypting data. Similarly, services 644, 646, 648 might also be a publisher and/or a subscriber in the ecosystem. In this regard, to make the storage or extraction of data by any of a private cloud store 600, SQL data services store 602, or simple storage web service 604, etc., the storage abstraction service 610, as the name implies, abstracts the specifics about the particular storage repository or repositories away from the clients.

In this regard, for the avoidance of doubt, FIG. 6 is directed to multiple situations. In one situation, FIG. 6 covers the disintermediation of storage providers (abstracting them out as individuals) through the Storage Abstraction Service, also referred to sometimes as the Compute and Storage Abstraction (CSA). In addition, FIG. 6 covers scenarios where data is segmented and/or fanned out (e.g., for redundancy) to multiple back-end storage providers, which can be of the same or different type, such that the original data can be reconstituted even is one (or a small number) of the back-end Storage Providers accidentally or intentionally delete or alter their copies of the data.

Figure 7:
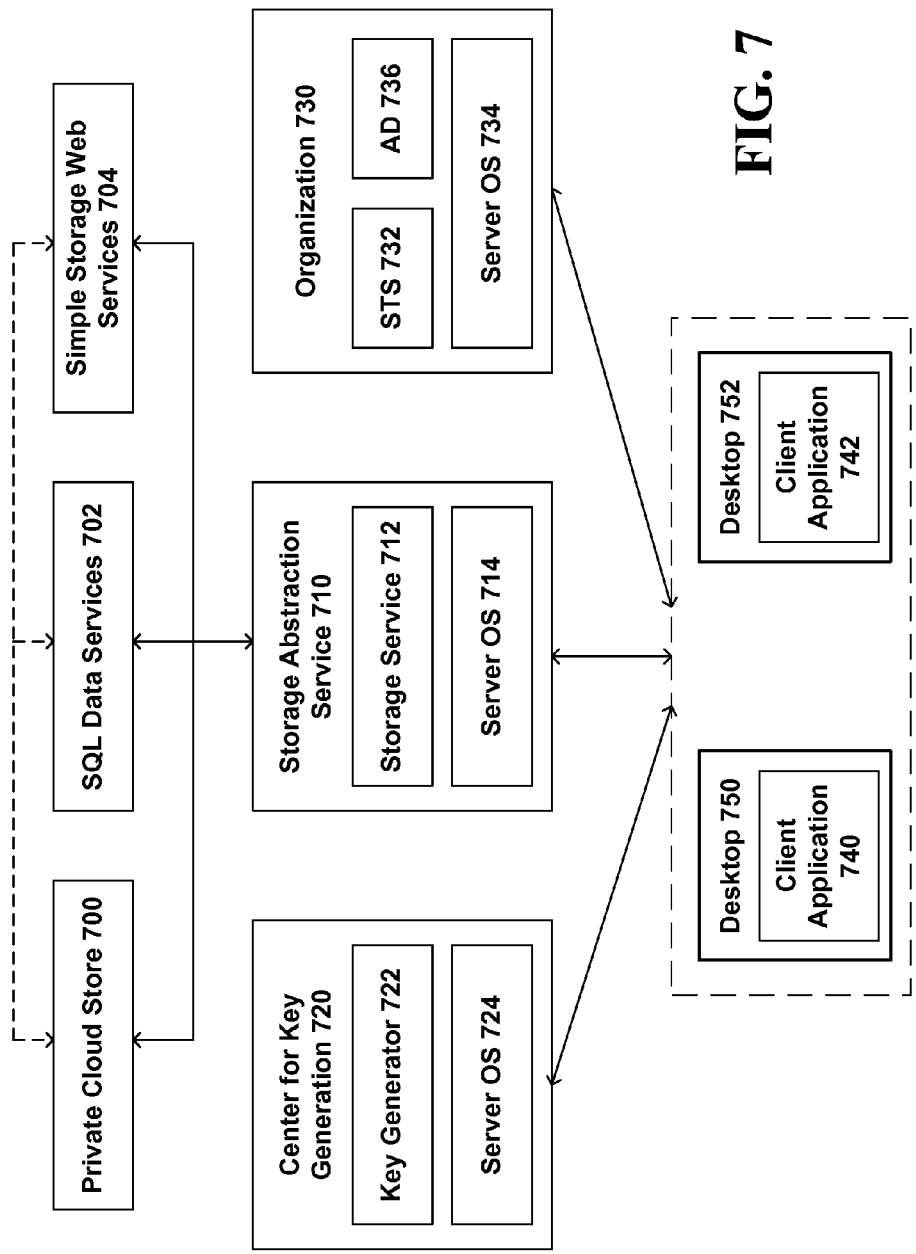
FIG. 7 illustrates further aspects of storage in connection with a storage abstraction service that abstracts storage details of various storage providers.

FIG. 7 illustrates further aspects of storage in connection with a storage abstraction service 710 including server operating system (OS) 714 and a storage service 712 that abstracts the details of storage of private cloud store 700, SQL data store 702, simple storage web service store 704, etc. The clients can be desktops 750 or 752 having client applications 740 and 742, respectively. The center for key generation 720 can include a key generator application 722 executing on server OS 724. In this regard, an organization 730 having active directory 736, server OS 734 and security token service (STS) 732 can be a publisher or subscriber in the ecosystem. In this regard, storage transfer format (STF) is a standard interchange format that can be used for exchanging encrypted data and metadata across repositories. For instance, organization 730 may wish to transfer e-mail data among storage service providers 700, 702 or 704 in which case STF can be used.

Figure 8:
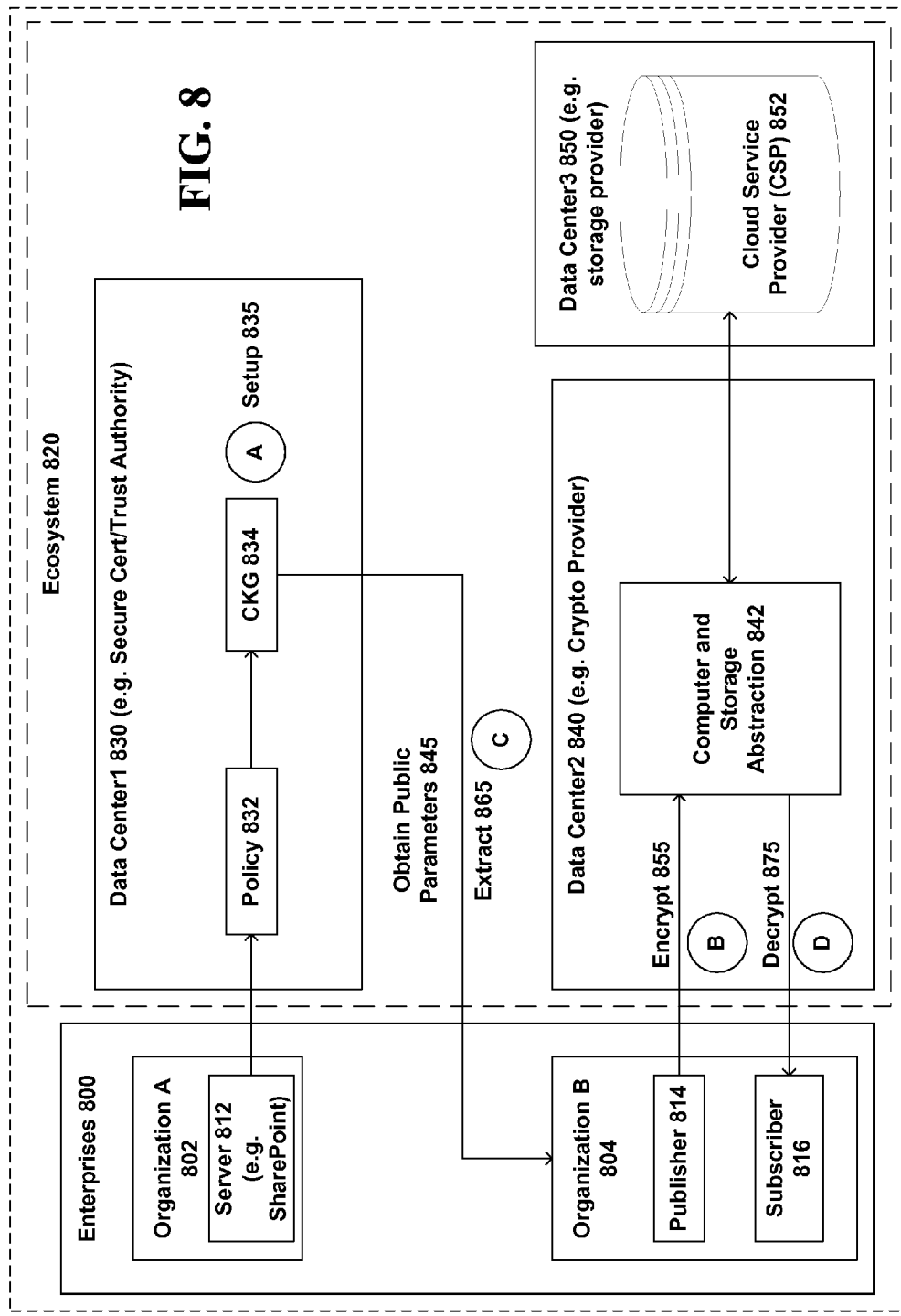
FIG. 8 is another block diagram illustrating various different participants in a trusted cloud services ecosystem.

FIG. 8 is another block diagram illustrating various different participants in a trusted ecosystem 820. As mentioned, advantageously, enterprises 800 can offload the storage and maintenance of volumes of data from on-site to cloud storage service providers better suited to handling such volumes while at the same time maintaining comfort that the data will not be decrypted to the wrong subscribers since the enterprise maintains control over capabilities defined over the encrypted data. For instance, an organization 802 may operate a collaborative application 812 such as SharePoint. In this regard, organization 802 may set up a digital escrow, or trusted domain, for the SharePoint data. The policy 832 and CKG 834 can be implemented by a first data center 830, which operates to setup the secure space by defining cryptographic key information 845 for the trusted domain.

Then, another organization 804, e.g., behaving as a publisher 814, can encrypt data based on the key information obtained from CKG 834, at which point computer and storage abstraction component 842 of a second data center 840 handles the details of storing the searchably encrypted data at a third data center 850, e.g., in CSP 852. On the flip side, when a subscriber 816 of organization 804 requests data, private or secret key information is delivered to subscriber 816 as part of extraction 865. Next, based on the private key information which includes capabilities defined for the subscriber, data requested by the subscriber is decrypted at 875 assuming the subscriber has privileges, and again abstraction layer 842 handles the details of the underlying storage 852.

Figure 9:
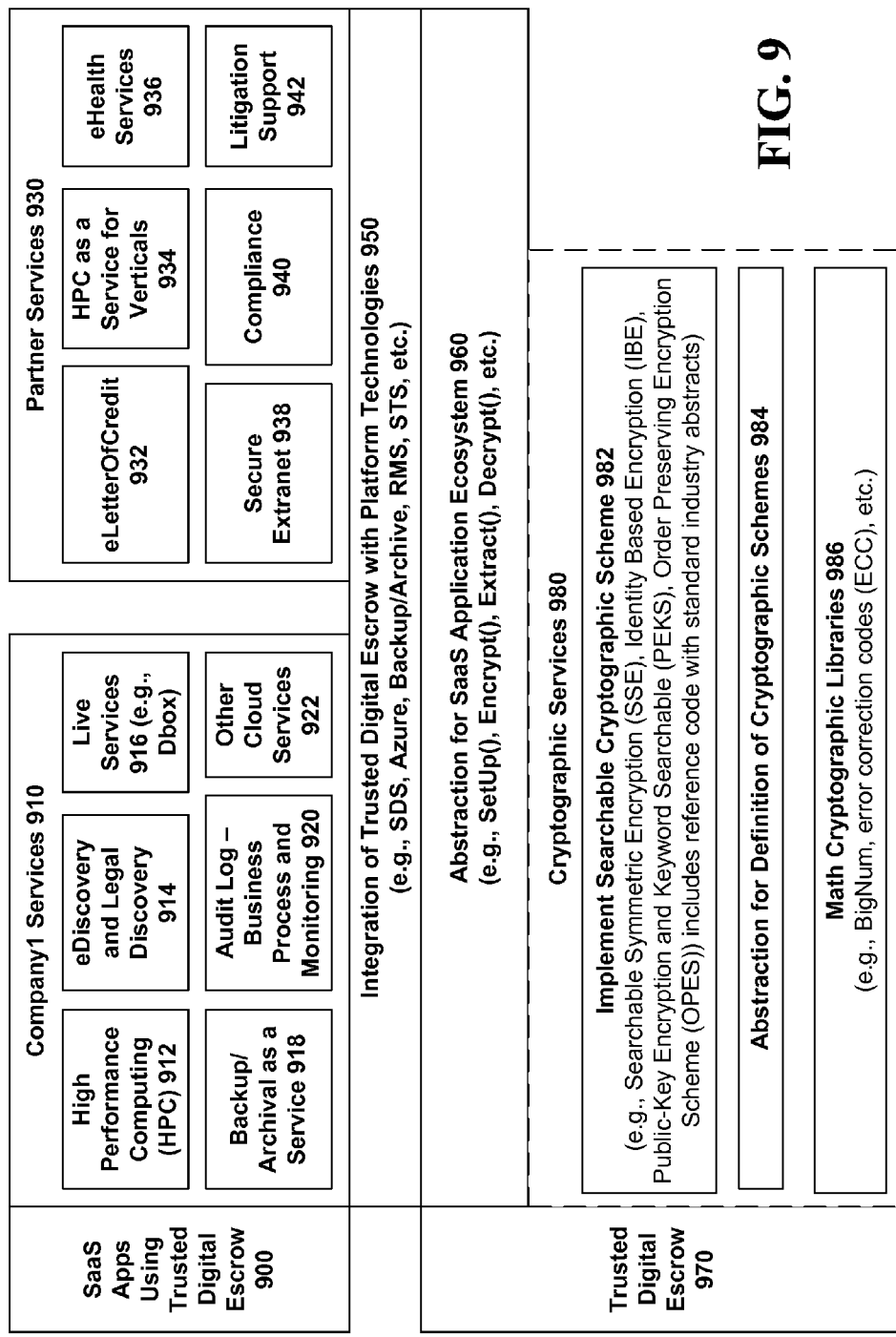
FIG. 9 is a representative view of some layers of an exemplary, non-limiting implementation of a trusted cloud computing system in which the different pieces can be provided by different or the same entities.

FIG. 9 is a representative view of some layers of an exemplary, non-limiting implementation of a trusted cloud computing system in which the different pieces can be provided by different or the same entities. At the bottom of the layer stack are math and cryptographic libraries 986 used for implementing the encryption/decryption algorithms. Abstraction of the definitions of various cryptographic schemes can be provided as a middle layer 984 between the detailed libraries 986 and the actual implementation of the searchable cryptographic schemes 982. Together, layers, 982, 984 and 986 form a larger cryptographic services layer 980, which when combined with an abstraction layer 960 for the software as a service (SaaS) application ecosystem, form the basis for an implementation of the trusted digital escrow 970 and storage therefor. The abstraction layer 960 contains the basic language used to implement the digital escrow pattern, namely commands such as SetUp( ), Encrypt( ), Extract( ), Decrypt( ), etc.).

On top of abstraction layer 960 is the layer 950 that ties into various more specific platform technologies (e.g., SDS, Azure, Backup/Archive, RMS, STS, etc.). On top of the layer 950 that ties into various specific platform technologies are the various SaaS applications that use the trusted digital escrow 900. The exemplary, non-limiting illustration shows that the digital escrow apps 900 can be implemented by a single company 910 or by partners 930 or by both. For instance, company 910 may implement services such as high performance computing (HPC), eDiscovery and Legal Discovery 914, Live Services 916 (e.g., DBox), backup/archive as a service 918, audit log—business process and monitoring 920 or other cloud services 922. In turn, partners 930 could implement services such as eLetterOfCredit 932, HPC as a service for verticals 934, eHealth services, secure extranet 938, compliance 940, litigation support 942, etc.

Scenarios Based on Trusted Cloud Services Ecosystem

The top half of FIG. 9 scratches the surface of the types of applications that can be realized in the cloud due to the increased trust inherent in the division of key generator, crypto provider and cloud service provider. In this regard, having enabled such a trusted cloud services ecosystem, a set of rich services and scenarios can be realized that take advantage of one or more of the benefits of the trusted ecosystem described herein.

Figure 10:
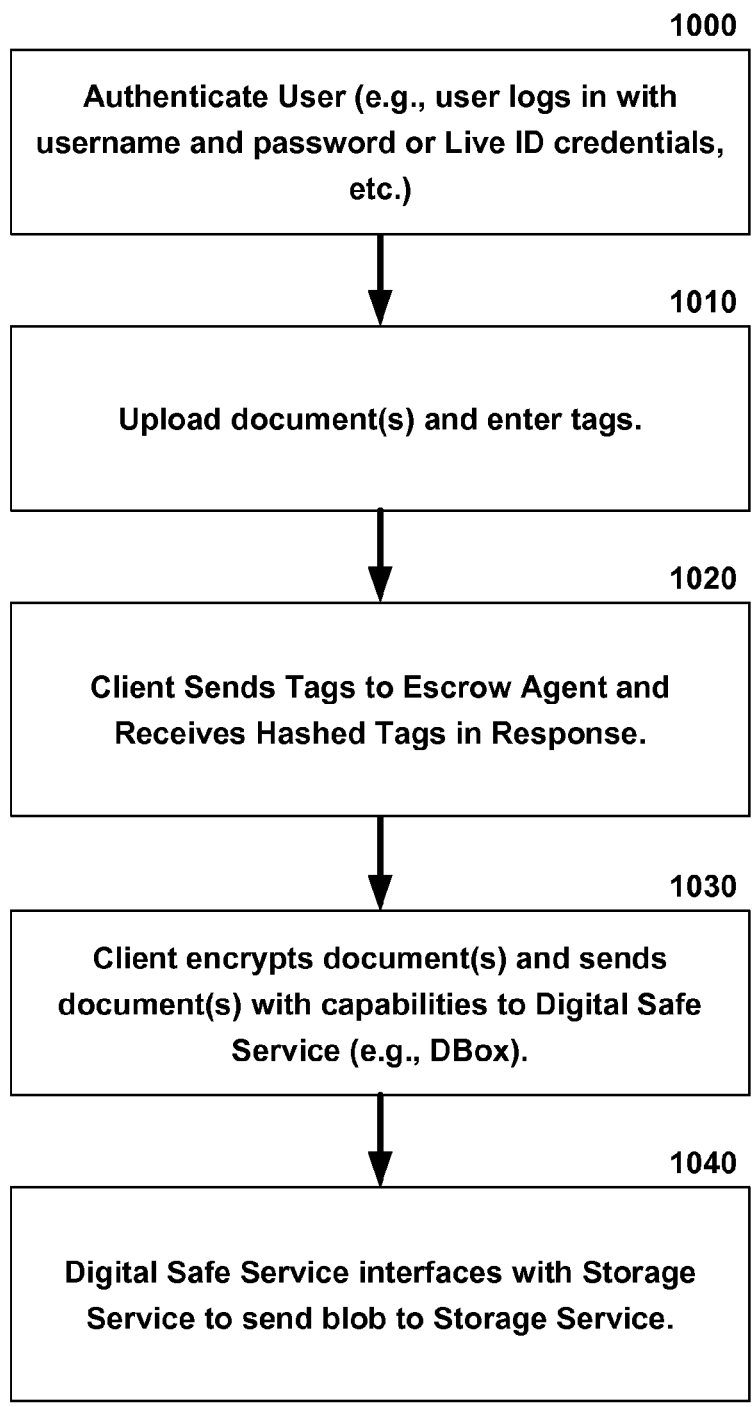
FIGS. 10-11 are flow and block diagrams, respectively, illustrating of an exemplary non-limiting process and/or system for publishing documents to a digital safe application in a way that provides publisher controlled selective access to the data with late binding.

For instance, FIG. 10 is a flow diagram of an exemplary non-limiting process for publishing documents to a digital safe application in a way that provides publisher controlled selective access to the data with late binding as described above. At 1000, a device is authenticates (e.g., the device logs in with a username and password, password credentials, biometric credentials, Live ID credentials, etc.). At 1010, the document(s) are uploaded and tags are entered. The tags are sent to an escrow agent at 1020 and hashed tags are received from the escrow agent in response. In this regard, the tags can be supplied as mentioned, or alternatively can be automatically extracted from the payload (record, document), e.g., through full-text indexing. At 1030, the client encrypts the documents with the publisher's key information and the document(s) are sent to a secure digital cloud storage provider along with capabilities for subscribers with respect to the document(s). At 1040, the secure digital cloud storage provider sends the encrypted blob to a storage service, e.g., vis-á-vis a storage abstraction layer.

Figure 11:
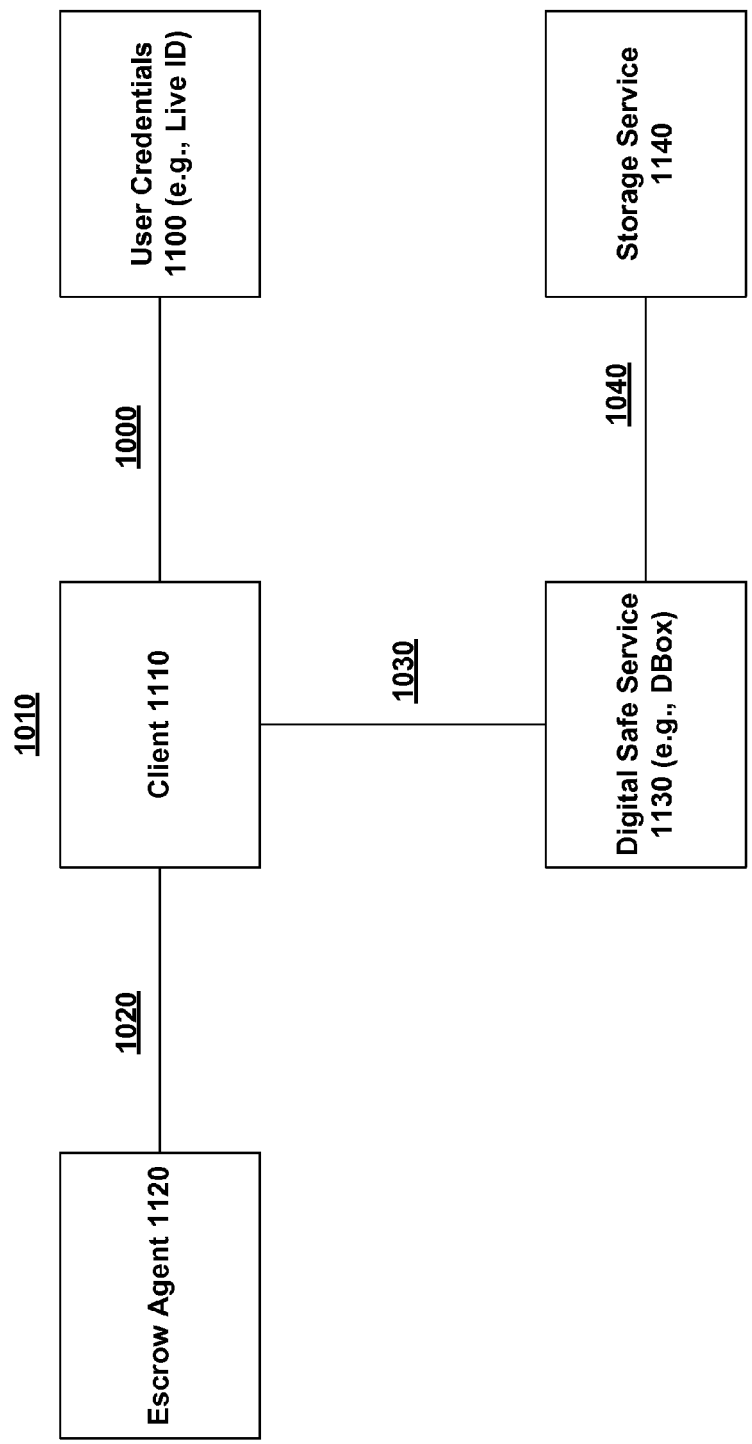

FIG. 11 illustrates FIG. 10 in the context of different participants in the trusted ecosystem with the acts of FIG. 10 labeled in the diagram. In this regard, beginning with the credentials 1100 of client 1110, 1000 occurs. Next, 1010 occurs at client 1110. Next, the step of sending tags to escrow agent 1120 and receiving hashed tags is represented at 1020. Next, client 1110 encrypts the documents and sends to digital safe service 1130 as shown at 1030. Lastly, the encrypted blob is sent to storage service 1140 as represented by 1040. A subscriber can then be granted access to a subset of the user if the capabilities sent with the document(s), or later updated, so permit.

Figure 12:
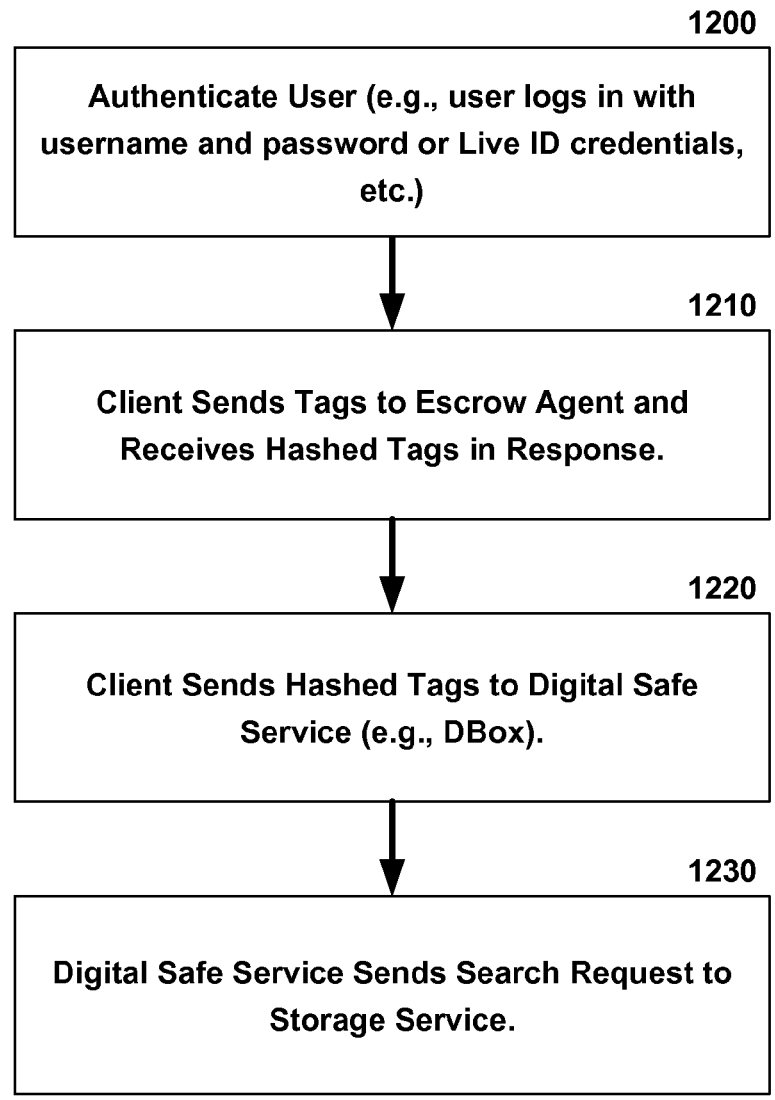
FIG. 12-13 are flow and block diagrams, respectively of an exemplary, non-limiting process and/or system for subscribing to data according to a digital safe scenario.

FIG. 12 is a flow diagram of an exemplary, non-limiting process for subscribing to materials placed in the digital safe. At 1200, the subscriber is authenticated and the client device sends tags to an escrow agent who sends back hashed tags in response at 1210. The client then sends the hashed tags to the digital safe service at 1220 and the hashed tags are interpreted to understand whether, at 1230, the client is entitled to have its search request carried out by the storage service, in whole or in part.

Figure 13:
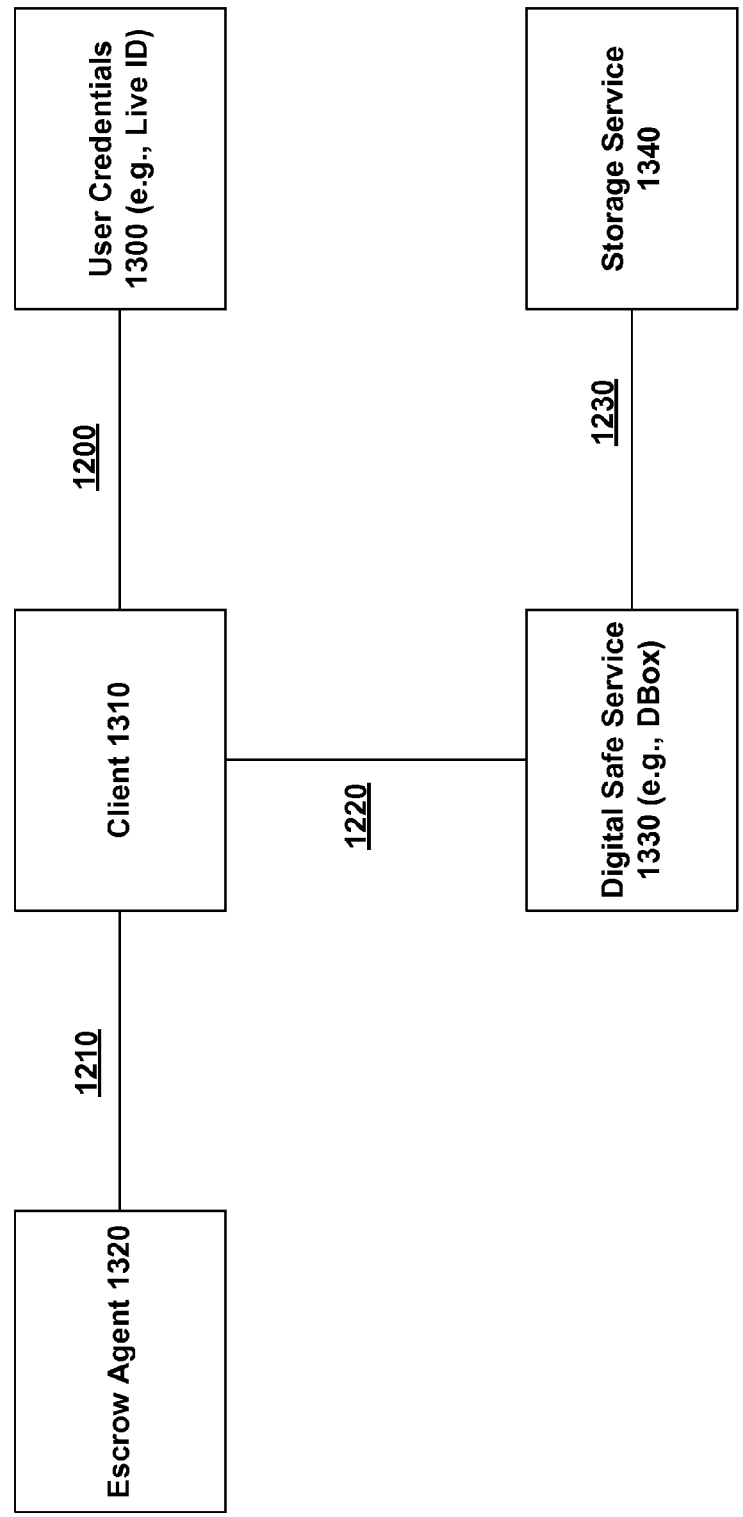

FIG. 13 represents the acts of FIG. 12 overlaid on the participants Similar to FIG. 11: client 1310 and its credentials 1300 for act 1200, client 1310 and escrow agent 1320 for act 1210, client 1310 and digital safe service 1330 for act 1220 and digital safe service 1330 and storage service 1340 for act 1230.

In FIGS. 11 and 13, the escrow agent 1120, 1320 can be the CKG, or a component of the CKG. Alternatively, escrow agent 1120, 1320 can be a CKG instance hosted by a separate participant whereby the escrow agent 1120, 1320 is a trusted entity that is encrypting/decrypting on behalf of the Client. In this regard, design tradeoffs and relationships among participants may dictate the function and scope of the escrow agent 1120, 1320. For instance, for low-end clients, offloading the client functionality to a trusted proxy service may be needed to perform heavy processing.

Figure 14:
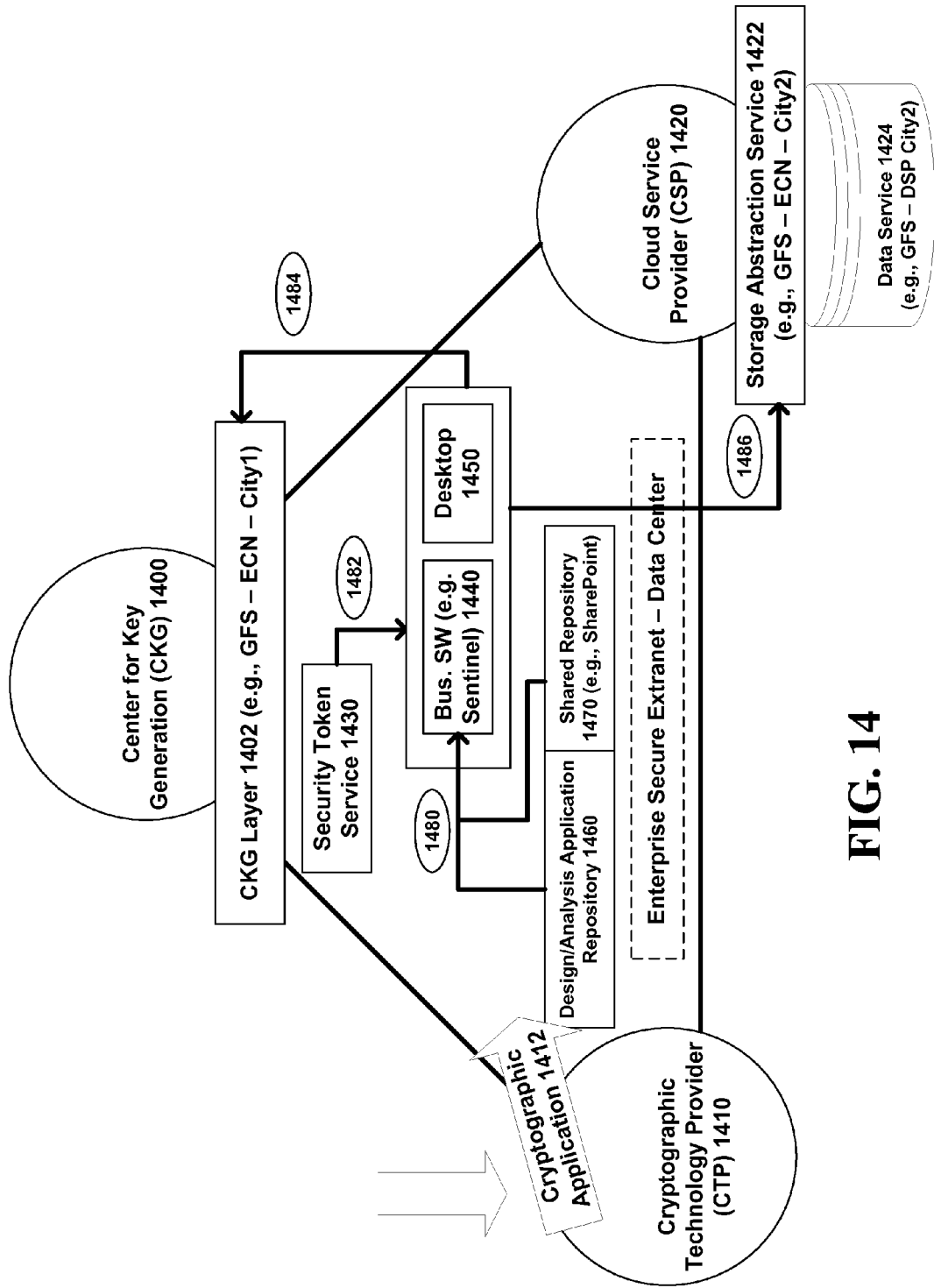
FIG. 14 illustrates an exemplary non-limiting implementation of a trusted cloud services ecosystem using a digital escrow pattern to implement a secure extranet for an enterprise via one or more data centers.

FIG. 14 illustrates an exemplary non-limiting implementation of a trusted cloud services using the digital escrow pattern to implement a secure extranet for an enterprise via one or more data centers. As mentioned, the trusted computing ecosystem can include a center for key generation 1400 implemented separately from a cryptographic technology provider (CTP) 1410, which provides reference implementations for use in implementing cryptographic techniques consistent with the ecosystem that are implemented separately from one or more cloud service providers (CSPs) 1420. In an exemplary non-limiting implementation of secure extranet, 1480 shows that the enterprise maintains a shared repository 1470 (e.g., SharePoint) and a repository 1460 of design or analysis applications for use in connection with the documents in shared repository 1470. Business software 1440 (e.g., Sentinel) can monitor application or server performance and the like for a computer having desktop 1450.

In this regard, in a trusted cloud services ecosystem, when a subscriber using the desktop 1450 seeks information selectively accessible and encrypted from storage, a security token service 1430 can deliver some information to identify the subscriber 1482 and the CKG 1400 can be consulted via interfaces of the CKG layer 1402 of a first data center as shown by 1484. The CKG 1400 returns key information which can then be used to selectively access data as shown by 1486 held by data service 1424 via storage abstraction service 1422. Any type of data can therefore be shared across an enterprise and selectively according to the roles of the subscribers in the enterprise.

Figure 15:
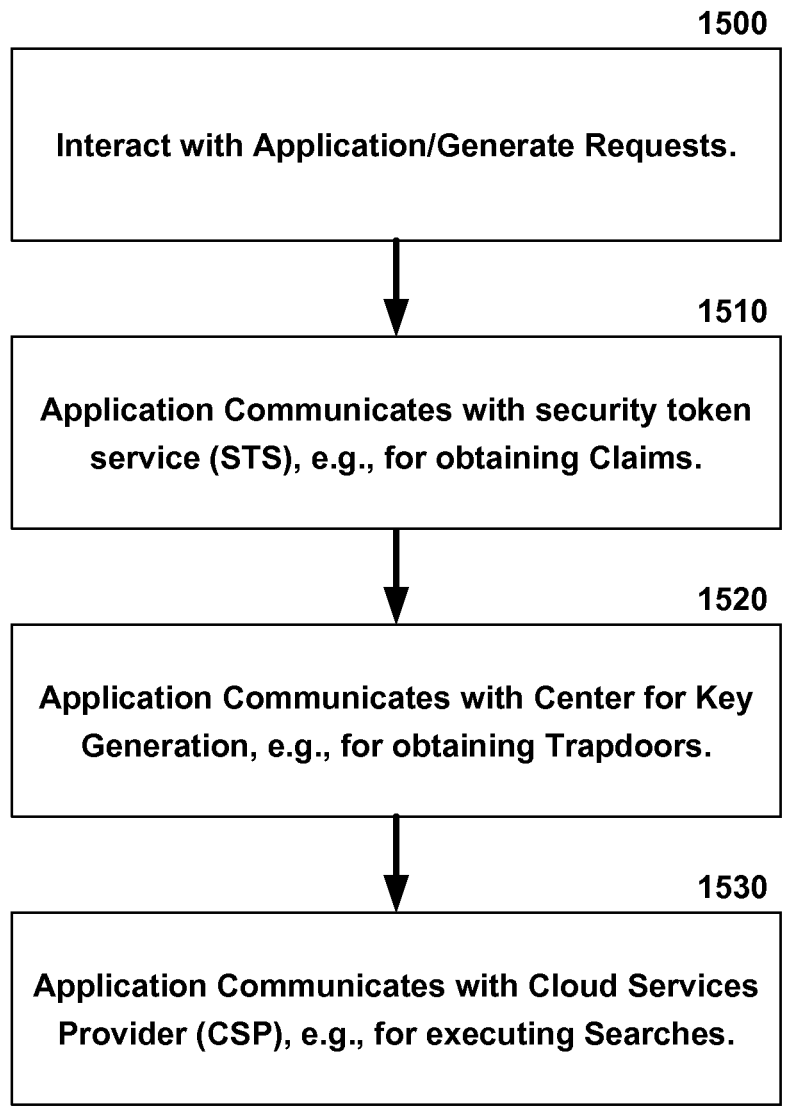
FIG. 15 is a flow diagram illustrating another exemplary non-limiting scenario based on a trusted cloud services ecosystem in which a subscriber is given selective access to encrypted data stored by a cloud service provider.

FIG. 15 is a flow diagram illustrating another exemplary non-limiting scenario based on a trusted cloud services ecosystem in which a subscriber is given selective access to encrypted data stored by a CSP, e.g., within an enterprise. Initially, the subscriber device has acquired no privileges to access the encrypted data. By making a request for some or all of the encrypted data however, e.g., by interacting with an application, at 1500, the application automatically communicates with a corresponding STS for obtaining Claims (in the parlance of cryptography) at 1510. At 1520, the application communicates with the CKG to obtain key information that encodes information about capabilities for the subscriber (capabilities are sometimes referred to as Trapdoors in the parlance of cryptography, though the term capabilities is not restricted to the context in which the term Trapdoor typically appears). Lastly, the application provides the key information to the CSP at 1530, which permits searches or queries over the encrypted data to the extent allowed by the subscriber's capabilities.

Figure 16:
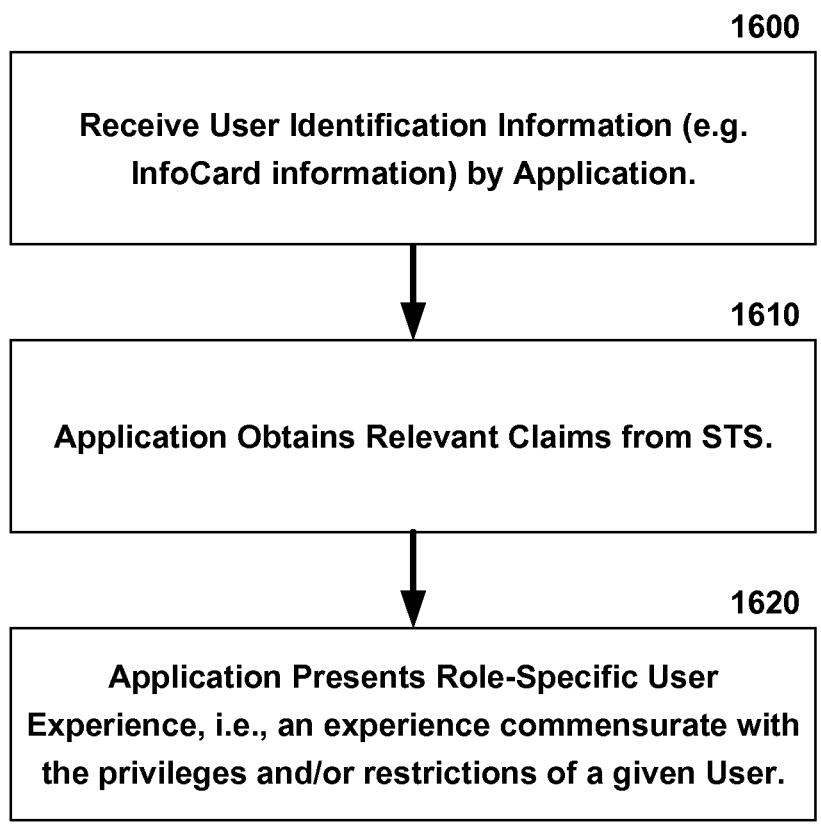
FIG. 16 is another flow diagram illustrating that the application response can be tailored to a subscriber based on user credentials.

FIG. 16 is another flow diagram illustrating that the application response can be tailored to a subscriber based on sign-in information. For instance, at 1600, user ID information is received by an application. At 1610, the application obtains relevant Claims from the STS. At 1620, based on one or more roles served by the user associated with the user ID information, the experience can be tailored commensurate with privileges/restrictions for those roles. For instance, the user experience with which a company's chief financial officer is presented as a view over the company's encrypted data can and should be a different user experience than the view over the company's encrypted data given to a mail room employee. FIG. 16 can apply to single or multi-party login scenarios.

Figure 17:
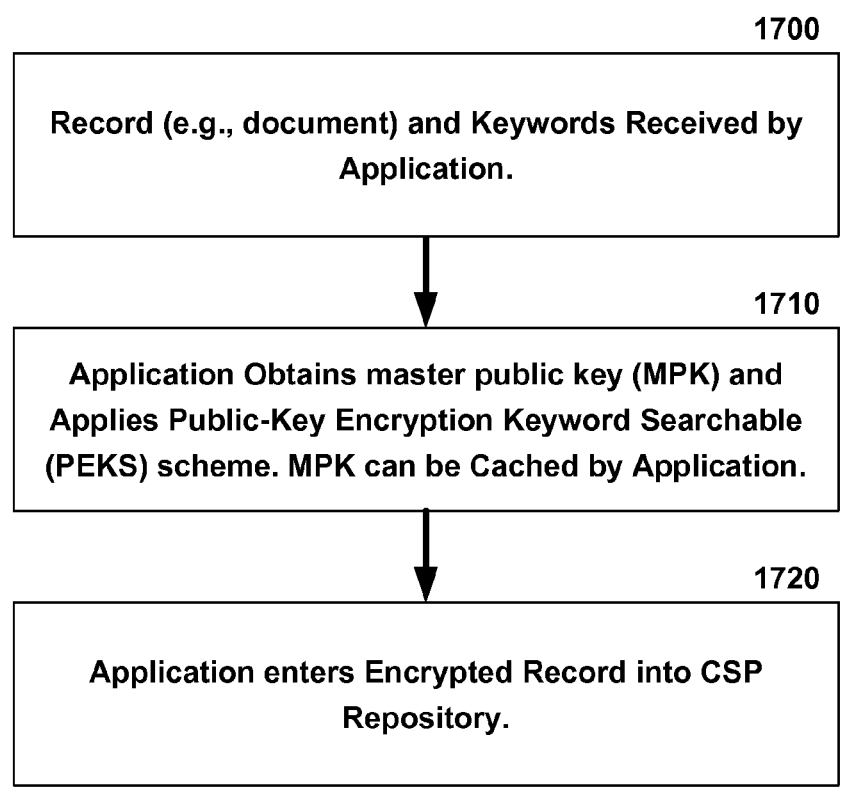
FIG. 17 is another flow diagram illustrating a secure record upload scenario, which can be implemented for a single party or multiple parties.

FIG. 17 is another flow diagram illustrating a secure record upload scenario, which can be implemented for a single party or multiple parties. At 1700, a record and keywords are received by an application, e.g., provided or designated by a user of a device with the application. At 1710, the application obtains a master public key (MPK) and applies public key encryption keyword searchable (PEKS) algorithm(s). The MPK can optionally be cached by the application. At 1720, the application enters the encrypted record into a CSP repository, e.g., via a storage abstraction layer.

Figure 18:
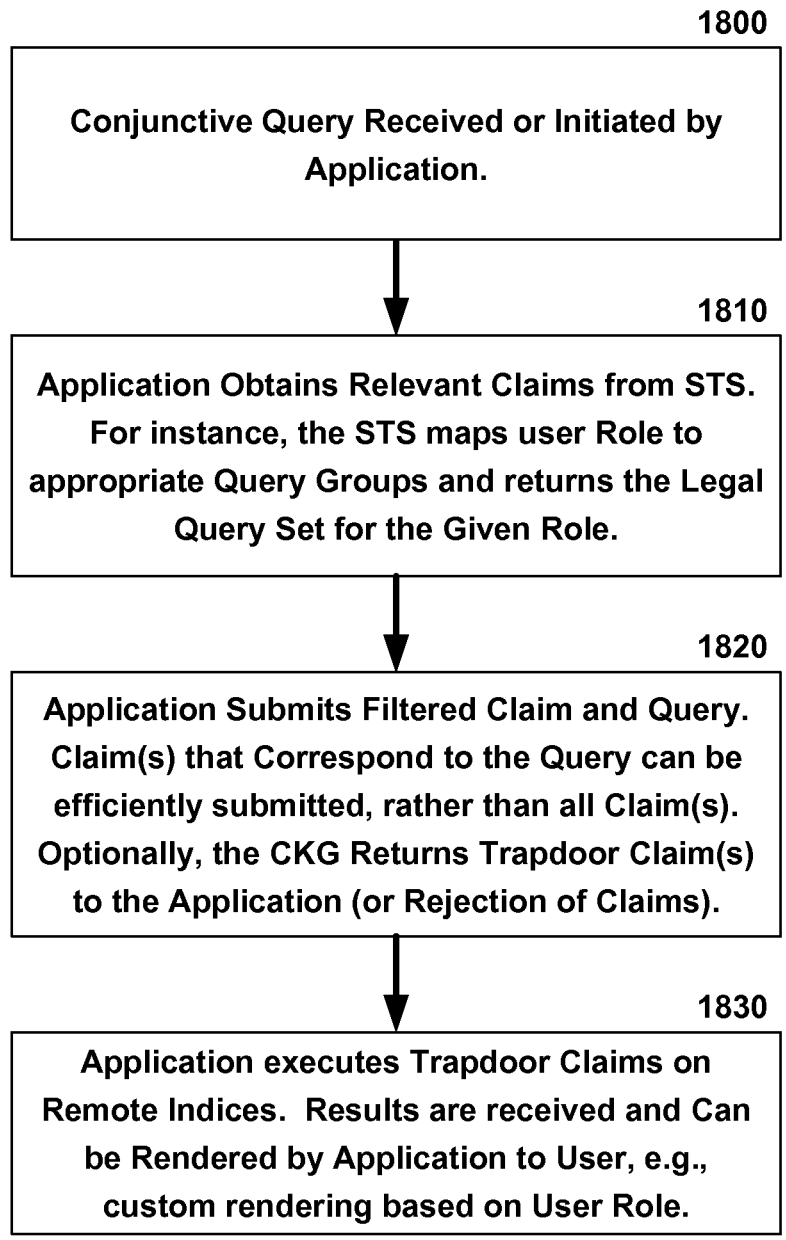
FIG. 18 is yet another flow diagram illustrating an exemplary non-limiting implementation of role-based querying over the searchably encrypted data store enabled by a trusted cloud services ecosystem, e.g., for automated search by a single party.

FIG. 18 is yet another flow diagram illustrating an exemplary non-limiting implementation of role-based querying over the searchably encrypted data store enabled by a trusted cloud services ecosystem, e.g., for automated search by a single party. At 1800, a conjunctive query is received or initiated by an application. At 1810, the application obtains relevant claims from the STS. For instance, the STS maps the user's Role(s) to appropriate Query Group(s) and returns the Legal Query Set for the Given Role(s). At 1820, the application submits a Filtered Claim and Query such that Claim(s) that Correspond to the Query can be efficiently submitted, rather than all Claim(s). Optionally, the CKG returns Trapdoor Claim(s) to the application (or Rejects the Claims). At 1830, the application executes the Trapdoor Claims on Remote Indices. Based on the processing over the Remote Indices, results are received and can be rendered by the application to the user, e.g., using custom rendering based on User Role(s).

Figure 19:
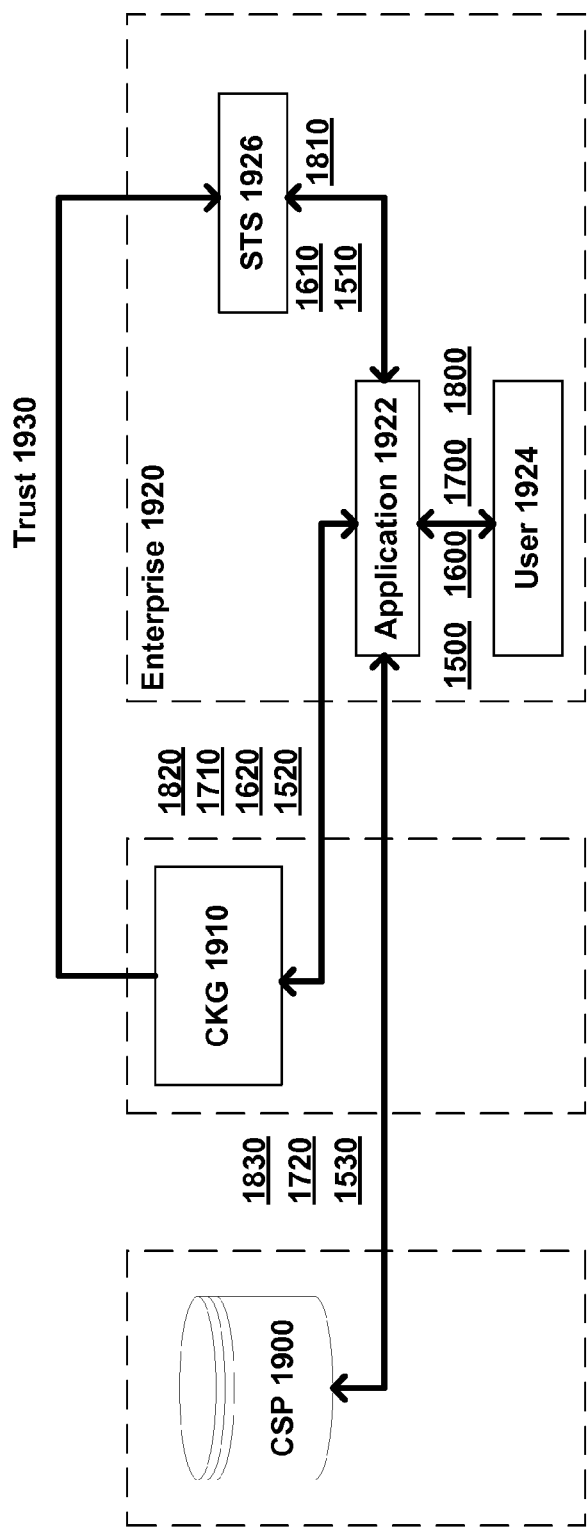
FIG. 19 is a block diagram of an implementation of a trusted cloud service ecosystem among an enterprise, a center for key generation and a cloud service provider in accordance with one or more scenarios.

FIG. 19 is a block diagram of an implementation of a trusted cloud service ecosystem among an enterprise 1920, a CKG 1910 and a CSP 1900 in which the acts of FIGS. 15-18 described above are highlighted via the same reference numerals. The scenarios begin with user 1924 identifying himself or herself to application 1922. The STS 1926 operates to establish trust 1930 in connection with the exchange of information to and from CKG 1910, returning key information to the application 1922 for use in encrypting or decrypting data from CSP 1900 depending on the goals of the scenario.

Figure 20:
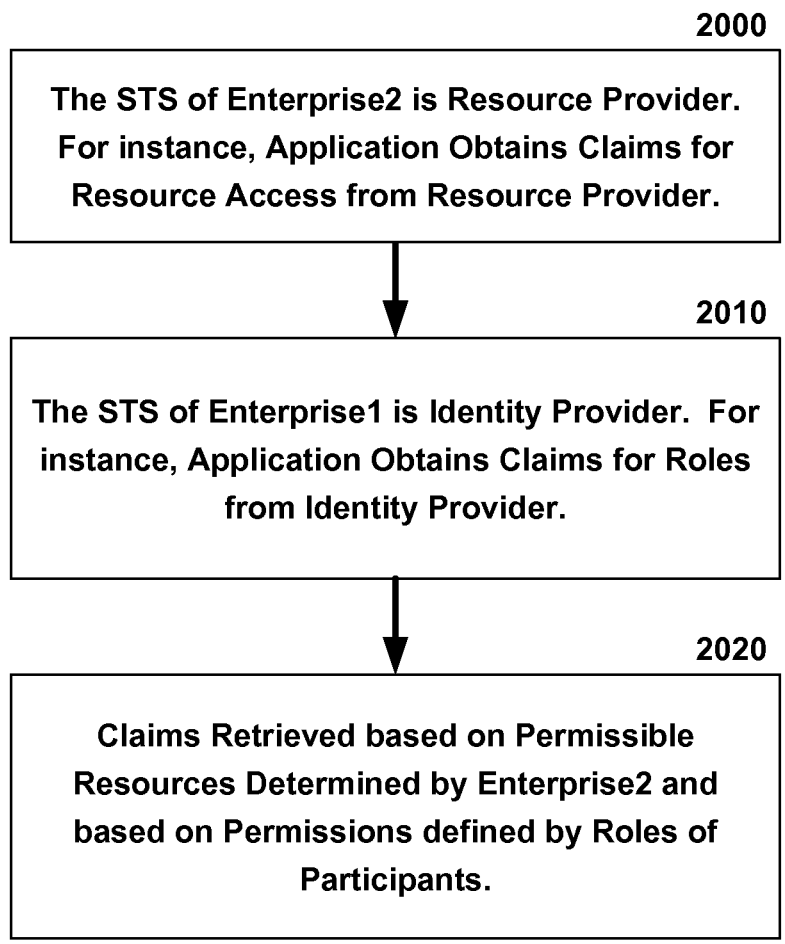
FIG. 20 is a flow diagram illustrating a multi-party cooperative scenario where an enterprise provides access to some of its encrypted data to an external enterprise.

FIG. 20 is a flow diagram illustrating a multi-party cooperative scenario where an enterprise provides access to some of its encrypted data to an external enterprise. For example, a manufacturer may grant a supplier access to some of its data stored in the trusted cloud, or vice versa. In this regard, at 2000, the STS of Enterprise2 is designated the resource provider and an application of Enterprise1 proceeds to obtain Claims for access to the resources provided by the resource provider in the cloud. At 2010, the STS of Enterprise1 is designated as the identity provider. In this respect, the application obtains the Claims for a role or set of roles defined by the subscriber at Enterprise1 as facilitated by the identity provider. At 2020, the Claims are retrieved by the application based on Permissible Resources controlled by Enterprise2 and based on Permissions/Capabilities defined by the role(s) of the subscribing entity. In FIG. 20, while only one STS is depicted, it is noted that that there can be multiple Identity Provider STSs and/or multiple Resource Provider STSs in a Digital Escrow, or Federated Trust Overlay.

Figure 21:
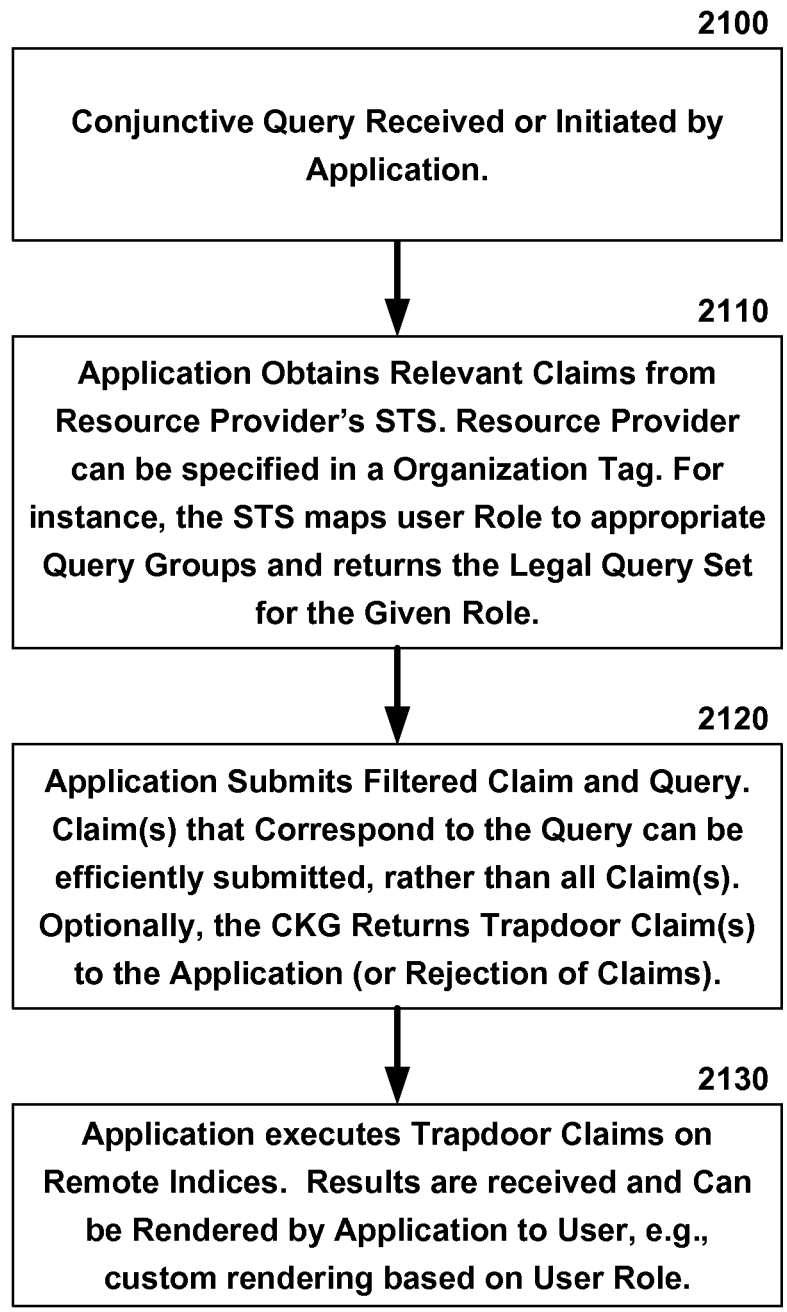
FIG. 21 is a flow diagram illustrating a multi-party automated search scenario among multiple enterprises.

FIG. 21 is a flow diagram illustrating a multi-party automated search scenario, e.g., among multiple enterprises such as Enterprise1 and Enterprise2. At 2000, a conjunctive query is received or initiated by an application of Enterprise1 for execution. At 2110, the application obtains relevant Claims from the STS of the resource provider (Enterprise2). The resource provider can be specified in an organization tag, optionally. The STS can optionally perform a mapping of user Role to Query Groups, so that the Legal Query Set is returned for the user Role. At 2120, the application submits a Filtered Claim and Query based on the user Role, The Claims that correspond to the Query can be efficiently submitted, rather than all Claim(s). Optionally, the CKG returns capabilities to the application (e.g., Trapdoor Claims), or the CKG rejects the Claims. At 2130, the application executes the Trapdoor Claims on Remote Indices. Based on the processing over the Remote Indices, results are received and can be rendered by the application to the user, e.g., using custom rendering based on User Role(s).

In FIGS. 18 and 21, the method includes a step of receiving a conjunctive query, or otherwise initiating a conjunction query. In this regard, optionally, conjunctive queries can also be cryptographically protected so that no recipient of a trapdoor (or capability), either the client or the service provider, can decompose the conjunctive query and determine its constituent parts.

Figure 22:
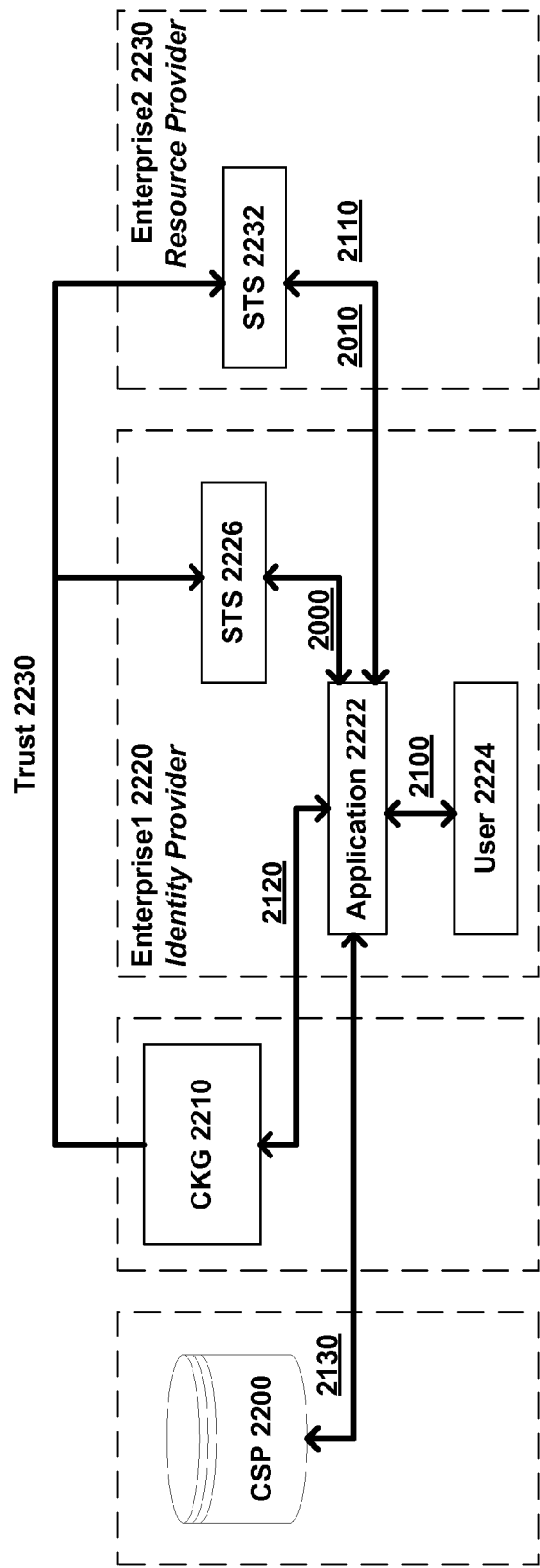
FIG. 22 is a block diagram of an implementation of a trusted cloud service ecosystem among multiple enterprises, a center for key generation and a cloud service provider in accordance with one or more scenarios.

FIG. 22 is a block diagram of an implementation of a trusted cloud service ecosystem among enterprises 2220, 2230, a CKG 2210 and a CSP 2200 in which the acts of FIGS. 20-21 described above are designated via the same reference numerals. For instance, a user 2224 can identify himself or herself to application 2222. The STS 2226 of enterprise 2220 and the STS 2232 of enterprise 2230 cooperate to establish trust 2230 in connection with the exchange of information to and from CKG 2210, returning key information to the application 2222 for use in encrypting or decrypting data from CSP 2200 depending on the goals of the scenario.

Figure 23:
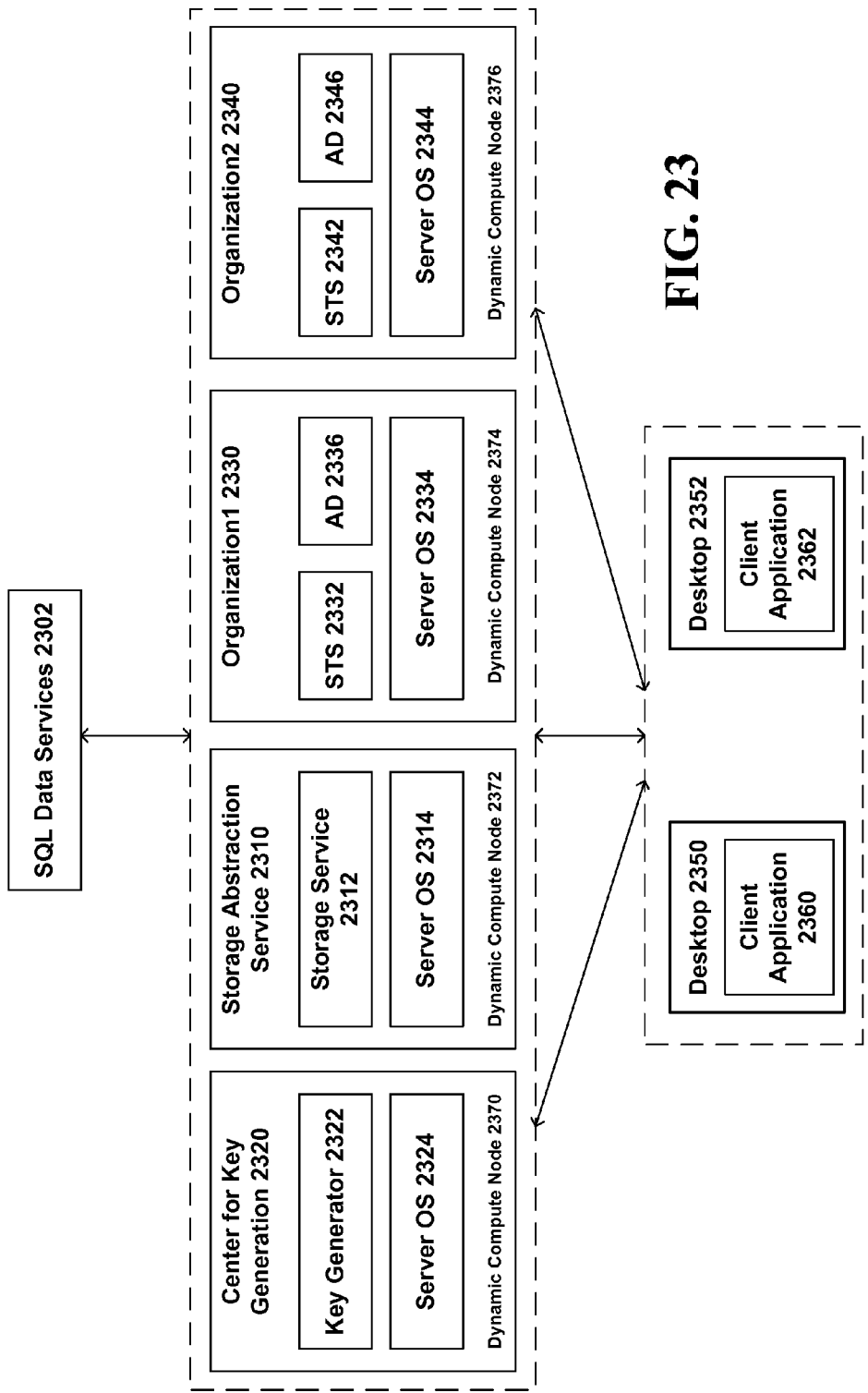
FIG. 23 illustrates an exemplary non-limiting edge compute network (ECN) technology that can be implemented for a trusted cloud service.

FIG. 23 illustrates an exemplary non-limiting edge compute network (ECN) technology that can be implemented for a trusted cloud service. In this regard, a plurality of dynamic compute nodes 2370, 2372, 2374, 2376 are dynamically allocated for computational bandwidth in connection with a set of trusted cloud components operating independently of one another. For instance, a center for key generation 2320, a storage abstraction service 2310, organization 2330 and organization 2340 can be implemented as shown to cover multi-organizational business or other scenarios, such as those described above. Center for key generation 2320 includes a key generator 2322 and a server OS 2324. Storage abstraction service 2310 includes a storage service component 2312 and a server OS 2314. Organization 2330 includes an STS 2332, an AD 2336 and a server OS 2334. Organization 2340 includes an STS 2334, an AD 2346 and a server OS 2344. The server OSs 2314, 2324, 2334, 2344 cooperate to implement the ECN across servers. Any storage provider or abstraction 2302 can be used for storage of data, e.g., SQL data services can be employed. In this way, one or more desktops 2350, 2352 can publish or subscribe to data via client applications 2360, 2362, respectively.

Figure 24:
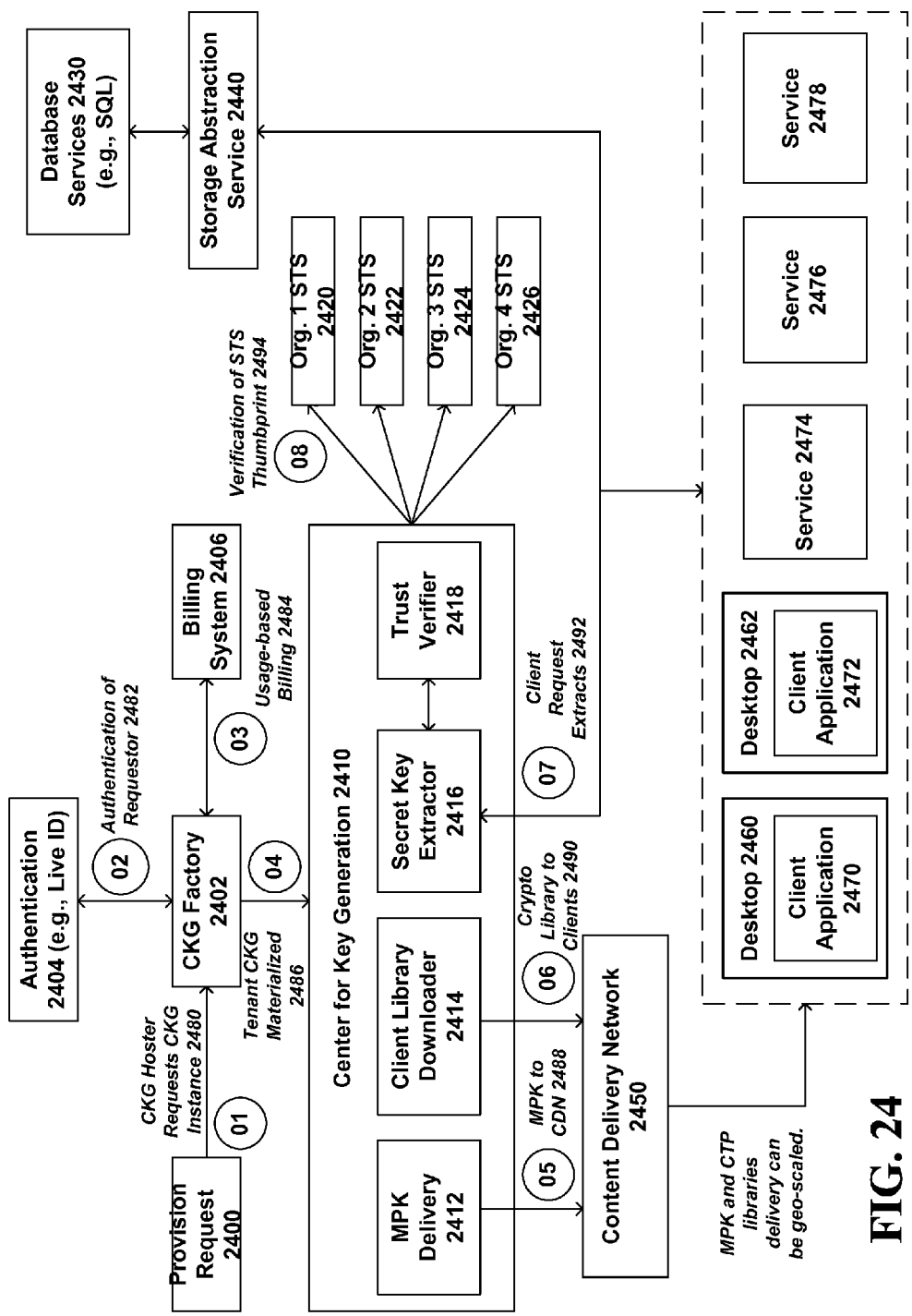
FIG. 24 is a block diagram illustrating one or more optional aspects of a center for key generation in accordance with a trusted cloud service ecosystem.

FIG. 24 is a block diagram illustrating one or more optional aspects of a center for key generation 2410 in accordance with a trusted cloud service ecosystem. Initially, a set of computing devices, such as desktops 2460, 2462 and respective client applications 2470, 2472, or services or servers 2474, 2476, 2478, etc. are potential publishers and/or subscribers to a cloud content delivery networks 2450. However, prior to fulfilling requests from any of the set of computing devices, initially a center for key generation acts as a custodian for trust for publishers encrypting data based on a public key, and handing out private keys to data subscribers based on their capabilities.

In an exemplary non-limiting interaction, initially a request from a computing device is provisioned 2400 and the hoster of the CKG 2410 requests an instance of the CKG 2410 from the CKG factory 2402 at 2480. Next, user authentication 2404 takes place at 2482. Next, any usage-based billing 2484 can be applied by billing system 2406 for use of the CKG factory 2402. Next, the tenant CKG is materialized at 2486 by CKG factory 2402, which may include MPK delivery component 2412, client library downloader 2414, secret key extractor 2416 and trust validator/verifier 2418.

MPK delivery component 2412 delivers MPK to the CDN 2450 at 2488. Client library downloader 2414 downloads crypto libraries to requesting clients which can be used in connection with encrypting data to be published or decrypting data to which the device is subscribed. Next, the client makes request to extract a given set of documents based on key information received from secret key extractor 2416, which cooperates with trust verifier 2418, which can validate that the subscriber has certain capabilities based on verifying the STS thumbprint of the subscriber at 2494, e.g., based on communication with different STSs 2420, 2422, 2424, 2426 of organizations involved in the request. As in other embodiments, a storage abstraction service 2440 can be provided to abstract storage details of database services 2430 (e.g., SQL).

Figure 25:
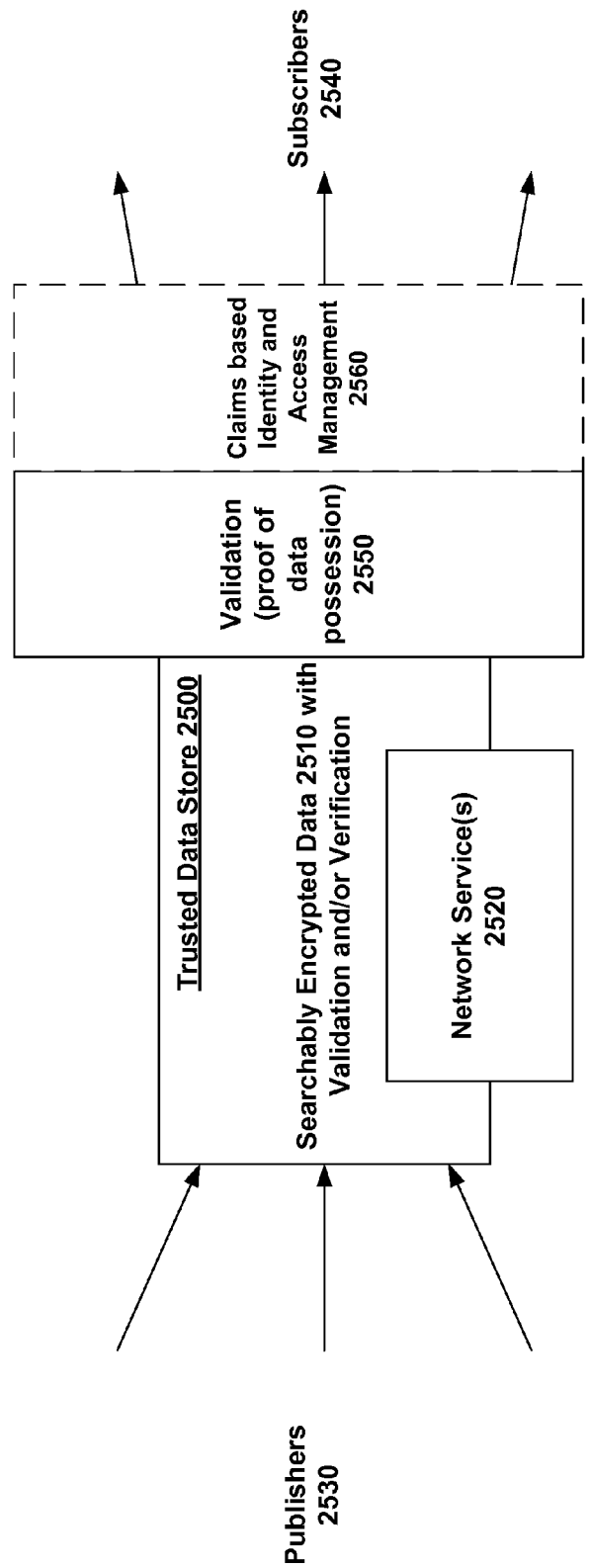
FIGS. 25-26 illustrate the incorporation of validation, e.g., proof of data possession, into the provision of trusted data services in an embodiment.

FIG. 25 is a block diagram of an exemplary non-limiting embodiment of a trusted store 2500 including searchably encrypted data 2510 with validation and/or verification, in connection with the delivery of network services 2520. In this embodiment, a subscriber 2540 or application used by subscriber 2540 can request, as part of a request to access certain parts of the encrypted store 2500, that a validation proof be run over the items returned from the request to validate that the items actually received are also the items that should have been received. In this regard, FIG. 25 illustrates the combination of searchable encryption techniques with techniques for validation. Optionally, the system may also be integrated with Claims-based Identity and Access Management, as described in other embodiments herein. In this regard, the Digital Escrow pattern, also referred to as Federated Trust Overlay, as described in various embodiments herein, can be integrate seamlessly with more traditional Claims-based Authentication systems.

In FIG. 25, the Trusted Data Store 2500 or the Service Provider or Hoster of the data store performs the proving step, whereas the owner of the data (e.g., the subscriber device) performs the validation. Data Store 2500 is trusted because the users can have confidence that it provides strong guarantees, though it is understood that physical entities actually host that data, and some participants are not fully trusted.

Figure 26:
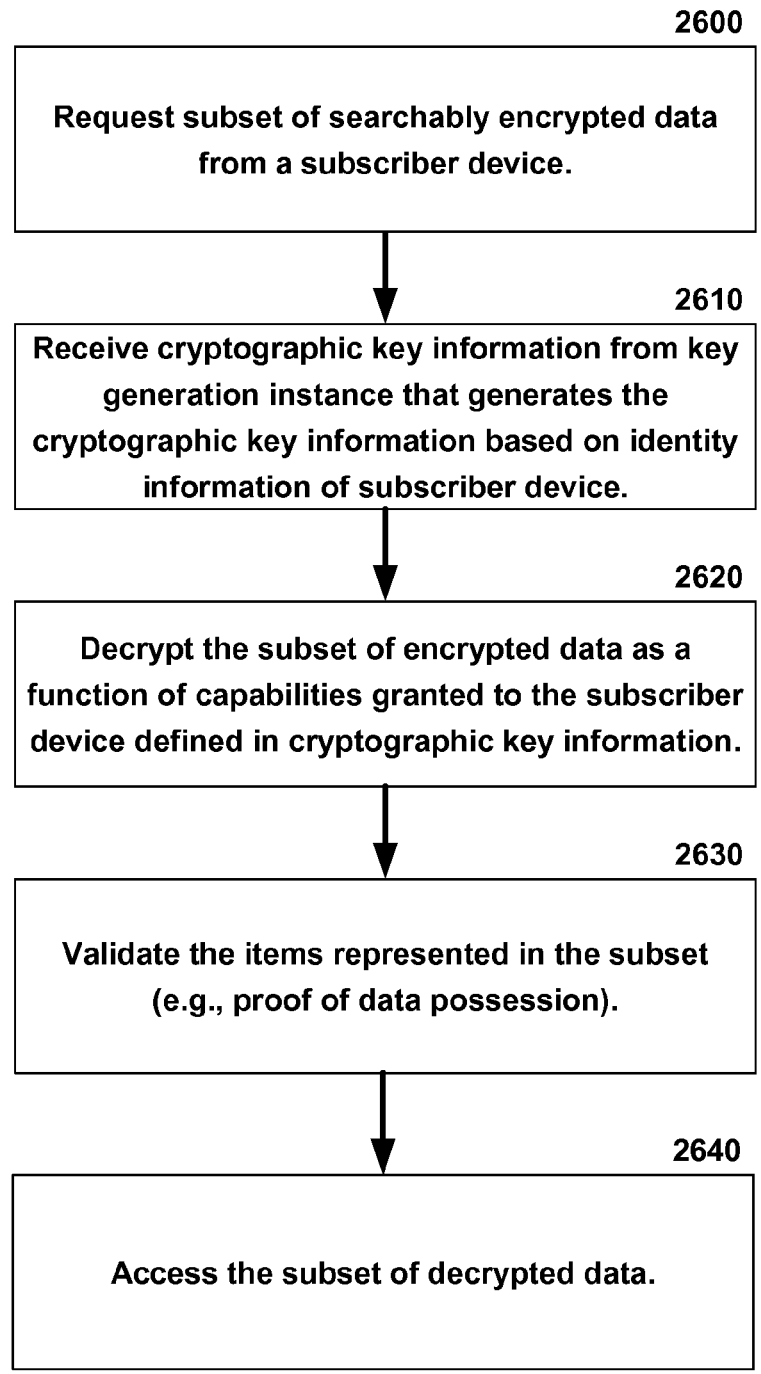

FIG. 26 is a flow diagram illustrating an exemplary non-limiting process for subscribing including a validation step. At 2600, a subset of searchably encrypted data is received from a subscriber device. At 2610, cryptographic key information is generated from key generation instance that generates the cryptographic key information based on identity information of the subscriber device. At 2620, the subset of encrypted data is decrypted as a function of capabilities granted to the subscriber device defined in cryptographic key information. At 2630, the items represented in the subset can be validated (e.g., proof of data possession) and the data is accessed at 2640.

In many cases, it is desirable to be able to execute PDP/POR over encrypted data without needing to decrypt it. Optionally, the key information needed for PDP can be encoded within the metadata that was protected with Searchable Encryption. While this is an effective way of managing the keys used for PDP/POR, it is noted there are many high-value scenarios where PDP/POR can be performed on encrypted data without needing access to the cleartext contents.

Figure 27:
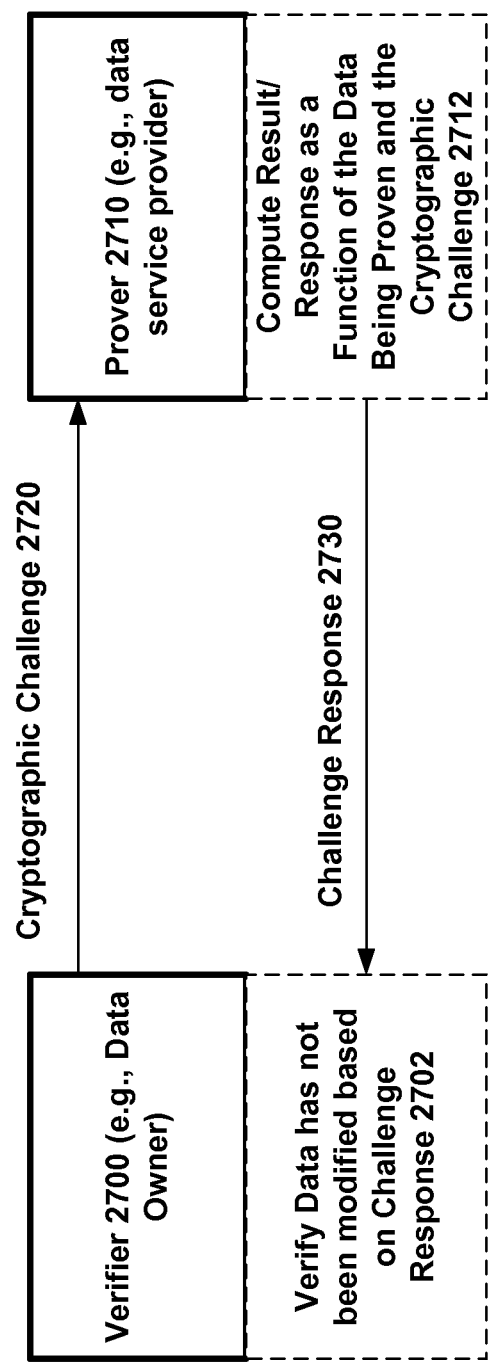
FIG. 27 is a block diagram illustrating exemplary validation of data of a data service in accordance with a trusted service ecosystem.

FIG. 27 illustrates an exemplary non-limiting validation challenge/response protocol in which a verifier 2700 (e.g., the data owner) issues a cryptographic challenge 2720 to a prover 2710 (e.g., the data service provider). Upon receiving the challenge 2720, the prover 2710 computes the response as a function of the data and the challenge 2712. The challenge response 2730 is then returned to verifier 2700, which then performs computation to verify or prove that the data has not been modified 2702.

Figure 30:
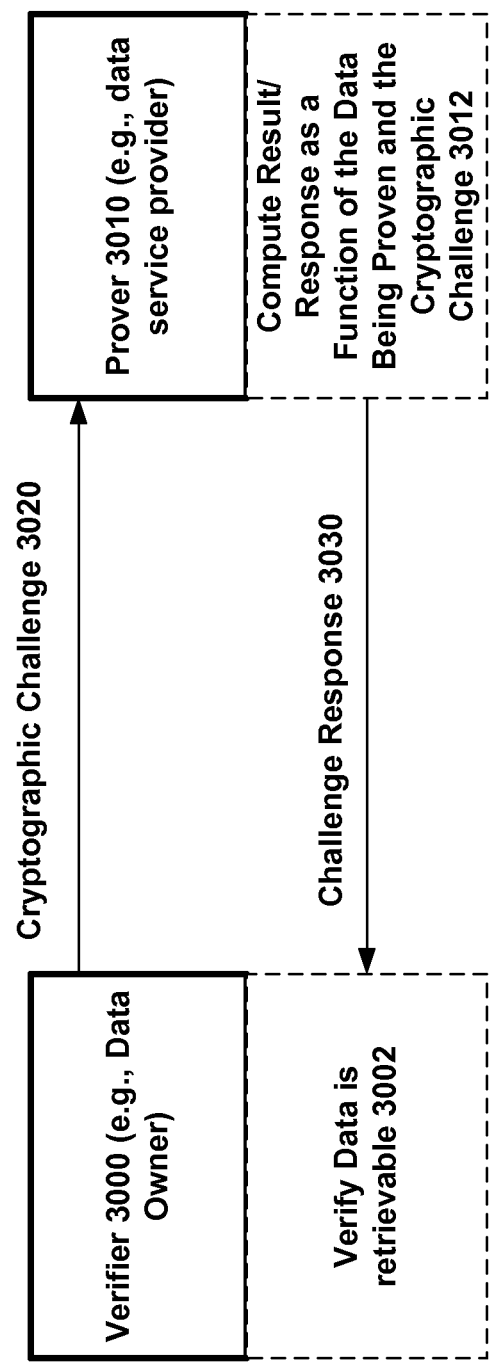
FIG. 30 is a block diagram illustrating exemplary validation of data of a data service in accordance with a trusted service ecosystem.

The validation generally illustrated in FIG. 27 is known as private PDP, though it is noted there is also a "Public" version where a third party is provided with a key (a "public" key) so the third party acts as the Verifier according to a similar protocol, without coming to know anything about the actual data. POR, an example of verification, is different from PDP in that it provides proof that the data is retrievable (despite any corruptions/modifications), but as illustrated in FIG. 30 below, the basic protocol is the same, though the structure of the documents and the actual algorithms are different. Various implementations of a trusted ecosystem herein combine Searchable Encryption and POR/PDP to benefit the system and bolster trust. In this regard, before submitting the data to the Service Provider, the data is searchably encrypted and post processing of the data can include POR and/or PDP.

In addition, a "data dispersion" technique can optionally be overlaid on any one or more of the above embodiments if there is a need to provide even stronger guarantees. With data dispersion, data is distributed to several Service Providers for resilience against "massively bad behavior" or catastrophic loss in any single Service Provider. Using the trust mechanisms described herein, this dispersion is performed in a way that makes it difficult for independent Service Providers to collude and corrupt the data. This is similar in concept to the above described distributed CKG embodiment.

Figure 28:
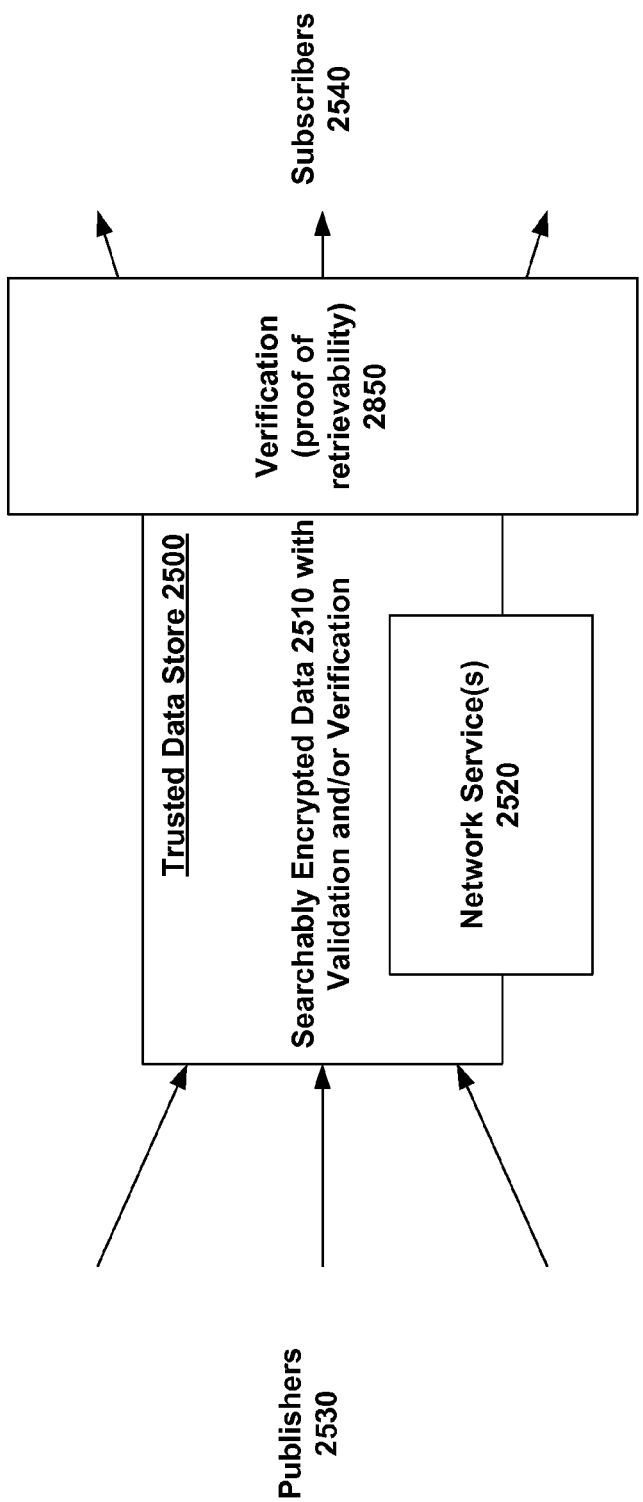
FIGS. 28-29 illustrate the incorporation of verification, e.g., proof of retrievability, into the provision of trusted data services in an embodiment.

FIG. 28 is a block diagram of another exemplary non-limiting embodiment of a trusted store 2500 including searchably encrypted data 2510 with validation and/or verification, in connection with the delivery of network services 2520. Specifically, FIG. 28 illustrates a verification component 2850 for verifying that the items returned to subscribers 2540 were not tampered with, or otherwise inadvertently altered. PDP, mentioned above, is a non-limiting example of verification.

Figure 29:
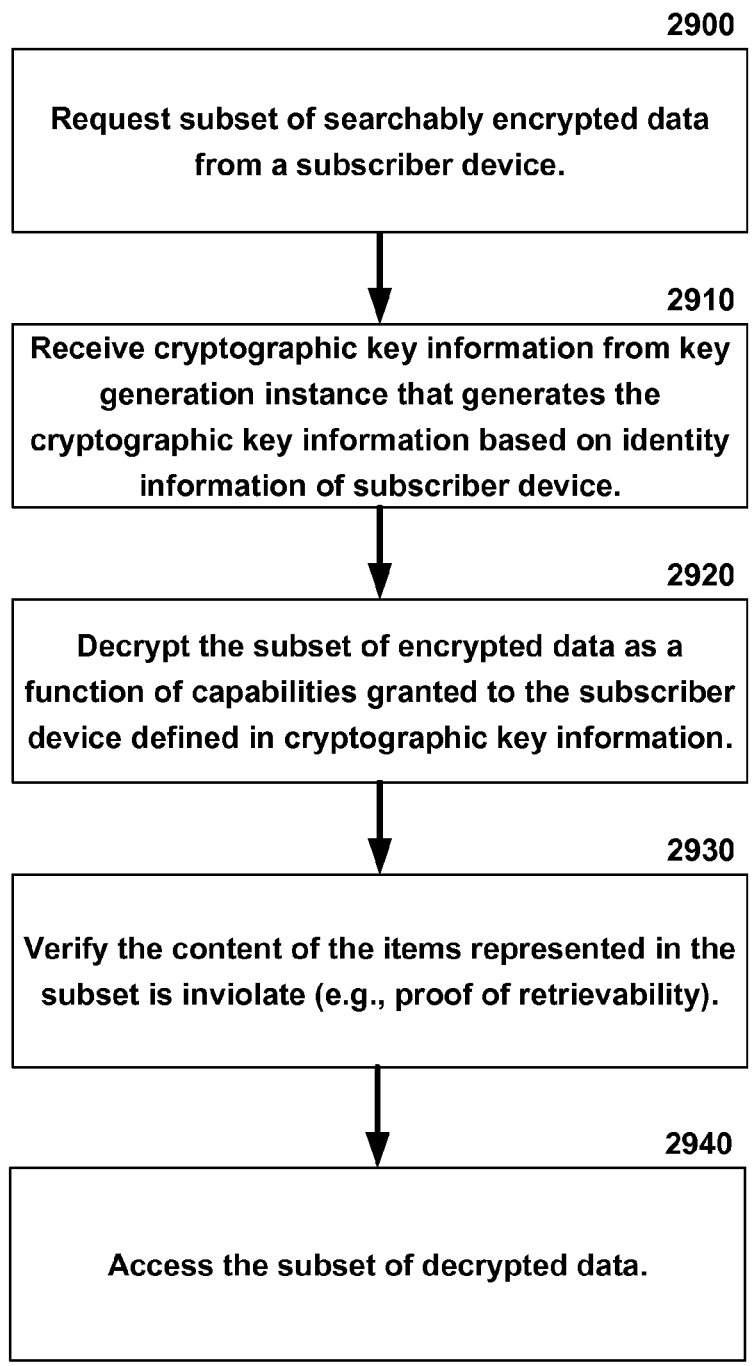

FIG. 29 is a flow diagram illustrating an exemplary non-limiting process for subscribing including a validation step. At 2900, a subset of searchably encrypted data is received from a subscriber device. At 2910, cryptographic key information is generated from key generation instance that generates the cryptographic key information based on identity information of the subscriber device. At 2920, the subset of encrypted data is decrypted as a function of capabilities granted to the subscriber device defined in cryptographic key information. At 2930, the content of the items represented in the subset can be verified (e.g., proof of retrievability) and the data is accessed at 2940.

FIG. 30 illustrates an exemplary non-limiting verification challenge/response protocol in which a verifier 3000 (e.g., the data owner) issues a cryptographic challenge 3020 to a prover 3010 (e.g., the data service provider). Upon receiving the challenge 3020, the prover 3010 computes the response as a function of the data and the challenge 3012. The challenge response 3030 is then returned to verifier 3000, which then performs computation to verify or prove that the data is retrievable 3002.

Figure 31:
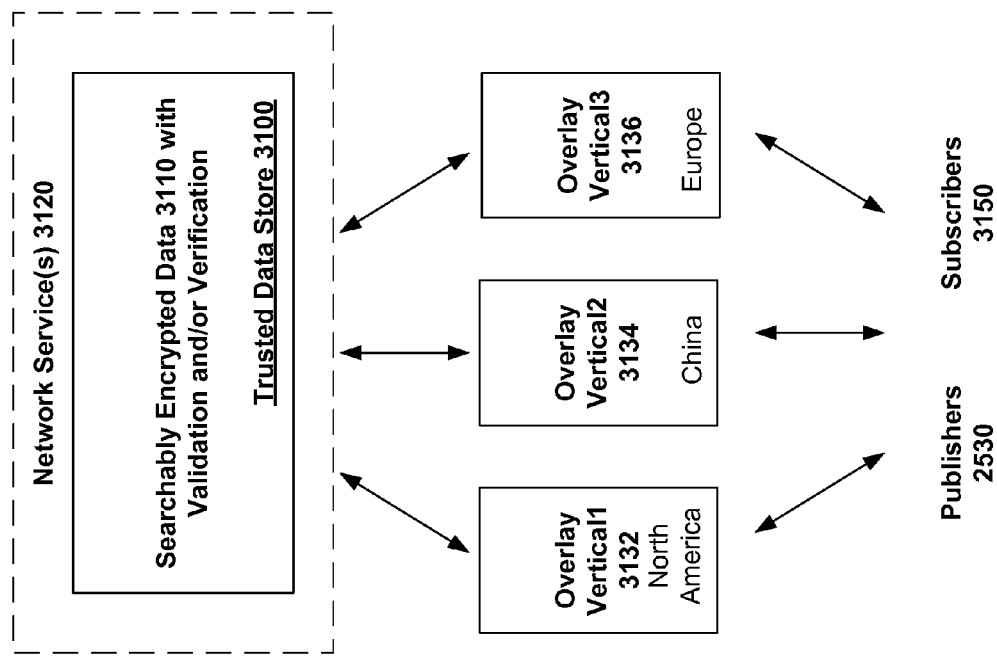
FIG. 31 is a block diagram illustrating the provision of multiple, different overlays or digital escrow verticals for publishers and subscribers to use based on a set of different conditions applicable to the use of a service, independent of the provision of the service itself.

FIG. 31 is a block diagram illustrating a non-limiting scenario where multiple, independent Federated Trust Overlays, or Digital Escrows can exist side by side, or on top of one another for a layered approach. In this scenario, there is a trusted data store 3100 having searchably encrypted data 3110 upon which various network service(s) 3120 can be predicated. For instance network service(s) 3120 can include the delivery of word processing software as a cloud service.

As part of geo-distribution, or otherwise, optionally, multiple Overlays/Escrows 3132, 3134, 3136 can be provided that are each tuned to different applications/verticals/compliance needs/sovereign entity requirements, such that the publishers 2530 or subscribers 3150 select, implicitly or explicitly, the correct Overlay/Escrow in which to participate, e.g., based on a set of requirements or area of jurisdiction/domicile. The overlay thus can change, but the back-end services from the cloud can remain the same without complicating the delivery of the core service itself.

Herein described are a variety of exemplary, non-limiting embodiments that illustrate the delivery of trusted data services. These embodiments are not standalone, but rather can be combined with one another where appropriate. In addition, any of the above-described embodiments can be extended in a number of alternative ways. For instance, in one embodiment, the trusted data services provide for the expiry and revocation of trapdoors or capabilities for greater degree of security over the access to the data. In another optional embodiment, a rights management layer is built into the provision of trusted data services, e.g., to preserve rights attached to content as part of encryption/decryption or to prevent acts with respect to copyrighted data in digital escrow that are more easily recognizable or detectable in the clear. Accordingly, any combinations or permutations of embodiments described herein are contemplated as within scope of the subject disclosure.

Exemplary Non-Limiting Implementation

An exemplary implementation of the digital escrow pattern is referred to as a Federated Trust Overlay (FTO). Attached in Appendix A are some additional non-limiting details about FTO implementations.

In this regard, the Digital Escrow Pattern is just an example of many possible patterns and variations. Furthermore, this pattern (which involves publishers, subscribers, administrators and auditors—and possibly other specialized roles as described above) is layered over another underlying FTO pattern, which performs the "church & state" separation of CTP, CSP, CKG, etc., to maintain trust. There can also be multiple, independent FTOs and DEPs that could co-exist without interfering with each other, and without even knowing about the existence of each other. Also, it is possible to overlay DEP and FTO patterns over Cloud storage without the Cloud Storage service provider co-operating, or even coming to know about the existence of these patterns/overlays.

In more detail, an FTO is a set of services that is independent of the data services in the cloud. These services are operated by parties other than the operator of the data services, and are able to provide strong guarantees regarding confidentiality, tamper detection and non-repudiation for the data hosted by the cloud services.

Any partner can construct and host these overlay services, e.g., a Mediator Service, the validation service, Storage Abstraction service, etc. These partners might choose to host a reference implementation, or construct their own implementation based on openly available formats and protocols.

Due to the open nature of the formats, protocols and the reference implementations, it would be straightforward to maintain a separation of control among parties, such as the operators of the FTO and the Data Owners.

While encryption is an element of this solution, the orchestration of services that are federated across different parties is also a part of the solution. While conventional encryption techniques are compelling for many scenarios, they preclude enabling many of the scenarios like tamper detection, non-repudiation, building trust by orchestrating multiple (untrusted) services, searching data repositories, etc.

Supplemental Context

For some additional non-limiting context, as described above, a trusted set of cloud offerings enables an application ecosystem for the cloud that builds on the trust. Various terminology used herein includes: CKG—Center for Key Generation, an entity that hosts a multi-tenant key generation center, e.g., any of Microsoft, VeriSign, Fidelity, A Sovereign Entity, Enterprise, Compliance Entity, etc. could host the CKG. In this regard, multi-tenancy is optional (e.g., desirable but not mandatory). Other terminology includes: CTP—Crypto Technology Provider, an entity that provides encryption technologies for use with the trusted ecosystem, e.g., any of Symantec, Certicom, Voltage, PGP Corp, BitArmor, Enterprise, Guardian, Sovereign Entity, etc. are example companies that could be CTPs.

In addition, the term CSP—Cloud Service Provider is an entity that provides cloud services, including storage. A variety of companies can provide such data services. A CIV—Cloud Index Validator is a second repository to validate returned indices. A CSA—Compute and Storage Abstraction abstracts the storage back-end. STF—Storage Transfer Format is a universal format for transferring data/metadata across repositories.

In this regard, as mentioned, some enterprise scenario(s) includes engineering extranet using data service technologies or applications, design and engineering analysis, defining data relationships among manufacturer and supplier(s), etc. A unique ecosystem is thus enabled for a whole variety of scenarios by distributing trust across multiple entities so that no 'uber' trusted entity or single point of compromise exists.

With respect to some supplemental context regarding searchable encryption, a user typically has or gets 'capabilities' or 'trapdoors' for keyword(s) and then sends a request using the 'capabilities' presenting them to the server. The server 'combines' capabilities and indices to find relevant documents or data. The user is then given access only to documents that result from the search (though the user may have access to more than just those documents).

As mentioned, no single algorithm should be considered as limiting on the provision of a searchably encrypted data store as described herein, however, the below generally outlines some of the theory behind an exemplary non-limiting algorithm and provides a primer for the Searchable Symmetric Encryption (SSE)

Pattern:
    Message: m
    Keywords: $w_1,...,w_n$
    PRF: H
    Generating escrow key
        Choose random S for H
    Encrypting
        Choose random key K
        Choose random fixed-length r
        For $1 \leq i \leq n$
            Compute $a_i = H_S(w_i)$
            Compute $b_i = H_{ai}(r)$
            Compute $c_i = b_i \oplus$ flag
    Output $(E_K(m), r, c_1, ..., c_n)$
    Generating trapdoor or capability for w
    $d = H_{Sj}(w)$
    Testing for w
    Compute $p = H_d(r)$
    Compute $z = p \oplus c_i$
    Output "true" if z = flag
    Decrypt $E_K(m)$ to obtain m While again not to be considered limiting on any embodiment described herein, the following is a primer regarding public-key encryption w/keyword search (PEKS) pattern.

---

Public-key encryption
a. PKE = (Gen, Enc, Dec)
Identity-based Encryption
b. IBE = (Gen, Enc, Extract, Dec)
c. Generating master keys
    i. (msk,mpk) = IBE.Gen( )
d. Encrypting m for ID
    i. c = IBE.Enc(mpk, ID, m)
e. Generating secret key for ID
    i. sk = IBE.Extract(msk, ID)
f. Decrypting
    i. m = IBE.Dec(sk, c)
g. Message: m
h. Keywords: $w_1,...,w_n$
i. Generating escrow keys
    i. (msk, mpk) = IBE.Gen( )
    ii. (pk,sk) = PKE.Gen( )
j. Encrypting
k. For $1 \leq i \leq n$
    i. $c_i$ = IBE.Enc(mpk, $w_i$, flag)
l. Return (PKE.Enc(pk,m),$c_1,...,c_n$)
m. Generating capability or trapdoor for w
    i. d = IBE.Extract(msk, w)
n. Testing for w
o. For $1 \leq i \leq n$
    i. z = IBE.Dec(d, $c_i$)
    ii. Output "true" if z = flag
    Decrypt $E_K$(m) to obtain m

---

Exemplary Networked and Distributed Environments

One of ordinary skill in the art can appreciate that the various embodiments of methods and devices for a trusted cloud services framework and related embodiments described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 32:
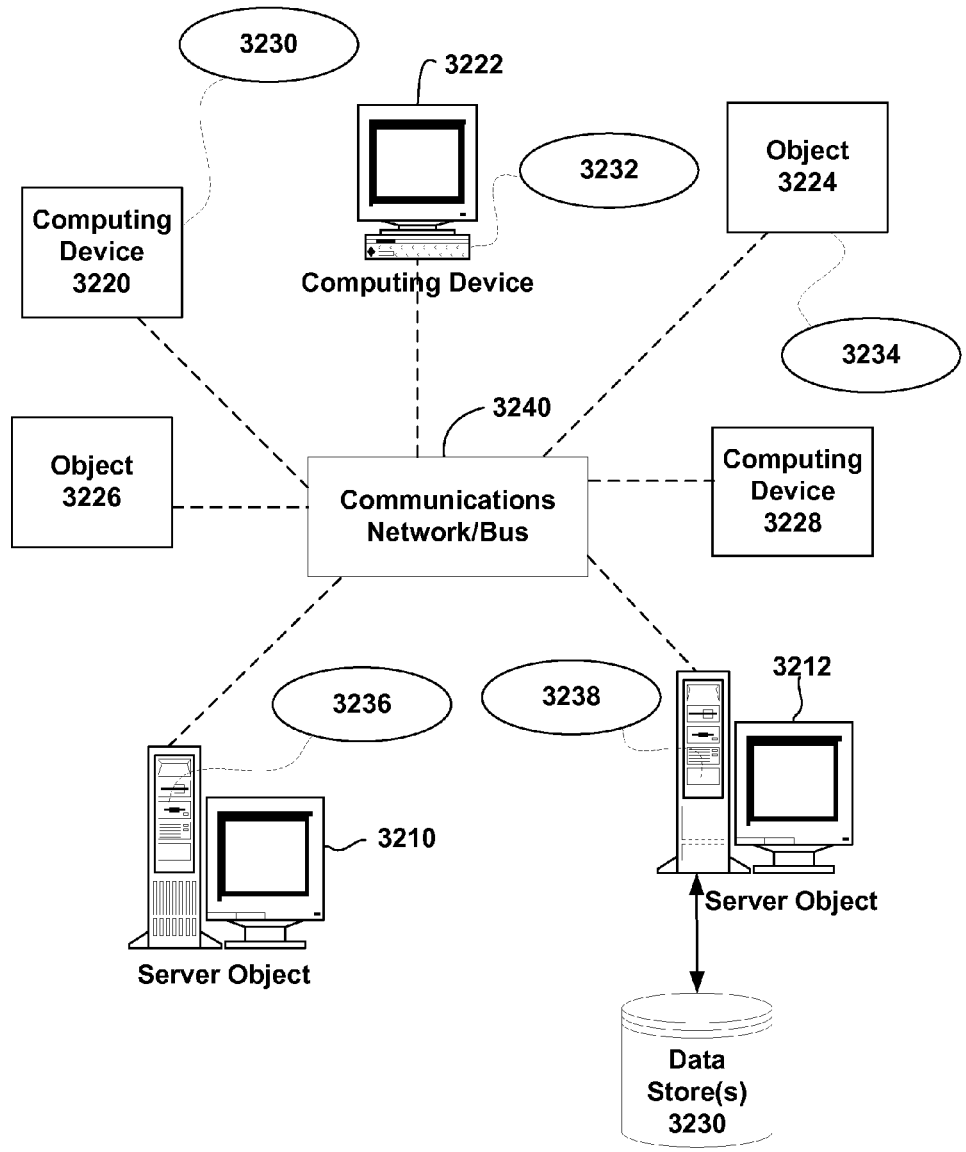
FIG. 32 is a block diagram representing exemplary non-limiting networked environments in which various embodiments described herein can be implemented.

FIG. 32 provides a non-limiting schematic diagram of an exemplary networked or distributed computing environment. The distributed computing environment comprises computing objects 3210, 3212, etc. and computing objects or devices 3220, 3222, 3224, 3226, 3228, etc., which may include programs, methods, data stores, programmable logic, etc., as represented by applications 3230, 3232, 3234, 3236, 3238. It can be appreciated that objects 3210, 3212, etc. and computing objects or devices 3220, 3222, 3224, 3226, 3228, etc. may comprise different devices, such as PDAs, audio/video devices, mobile phones, MP3 players, laptops, etc.

Each object 3210, 3212, etc. and computing objects or devices 3220, 3222, 3224, 3226, 3228, etc. can communicate with one or more other objects 3210, 3212, etc. and computing objects or devices 3220, 3222, 3224, 3226, 3228, etc. by way of the communications network 3240, either directly or indirectly. Even though illustrated as a single element in FIG. 32, network 3240 may comprise other computing objects and computing devices that provide services to the system of FIG. 32, and/or may represent multiple interconnected networks, which are not shown. Each object 3210, 3212, etc. or 3220, 3222, 3224, 3226, 3228, etc. can also contain an application, such as applications 3230, 3232, 3234, 3236, 3238, that might make use of an API, or other object, software, firmware and/or hardware, suitable for communication with or implementation of a trusted cloud computing service or application as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 32, as a non-limiting example, computers 3220, 3222, 3224, 3226, 3228, etc. can be thought of as clients and computers 3210, 3212, etc. can be thought of as servers where servers 3210, 3212, etc. provide data services, such as receiving data from client computers 3220, 3222, 3224, 3226, 3228, etc., storing of data, processing of data, transmitting data to client computers 3220, 3222, 3224, 3226, 3228, etc., although any computer can be considered a client, a server, or both, depending on the circumstances. Any of these computing devices may be processing data, or requesting services or tasks that may implicate the improved user profiling and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 3240 is the Internet, for example, the servers 3210, 3212, etc. can be Web servers with which the clients 3220, 3222, 3224, 3226, 3228, etc. communicate via any of a number of known protocols, such as the hypertext transfer protocol (HTTP). Servers 3210, 3212, etc. may also serve as clients 3220, 3222, 3224, 3226, 3228, etc., as may be characteristic of a distributed computing environment.

Exemplary Computing Device

As mentioned, various embodiments described herein apply to any device wherein it may be desirable to implement one or pieces of a trusted cloud services framework. It should be understood, therefore, that handheld, portable and other computing devices and computing objects of all kinds are contemplated for use in connection with the various embodiments described herein, i.e., anywhere that a device may provide some functionality in connection with a trusted cloud services framework. Accordingly, the below general purpose remote computer described below in FIG. 33 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 33:
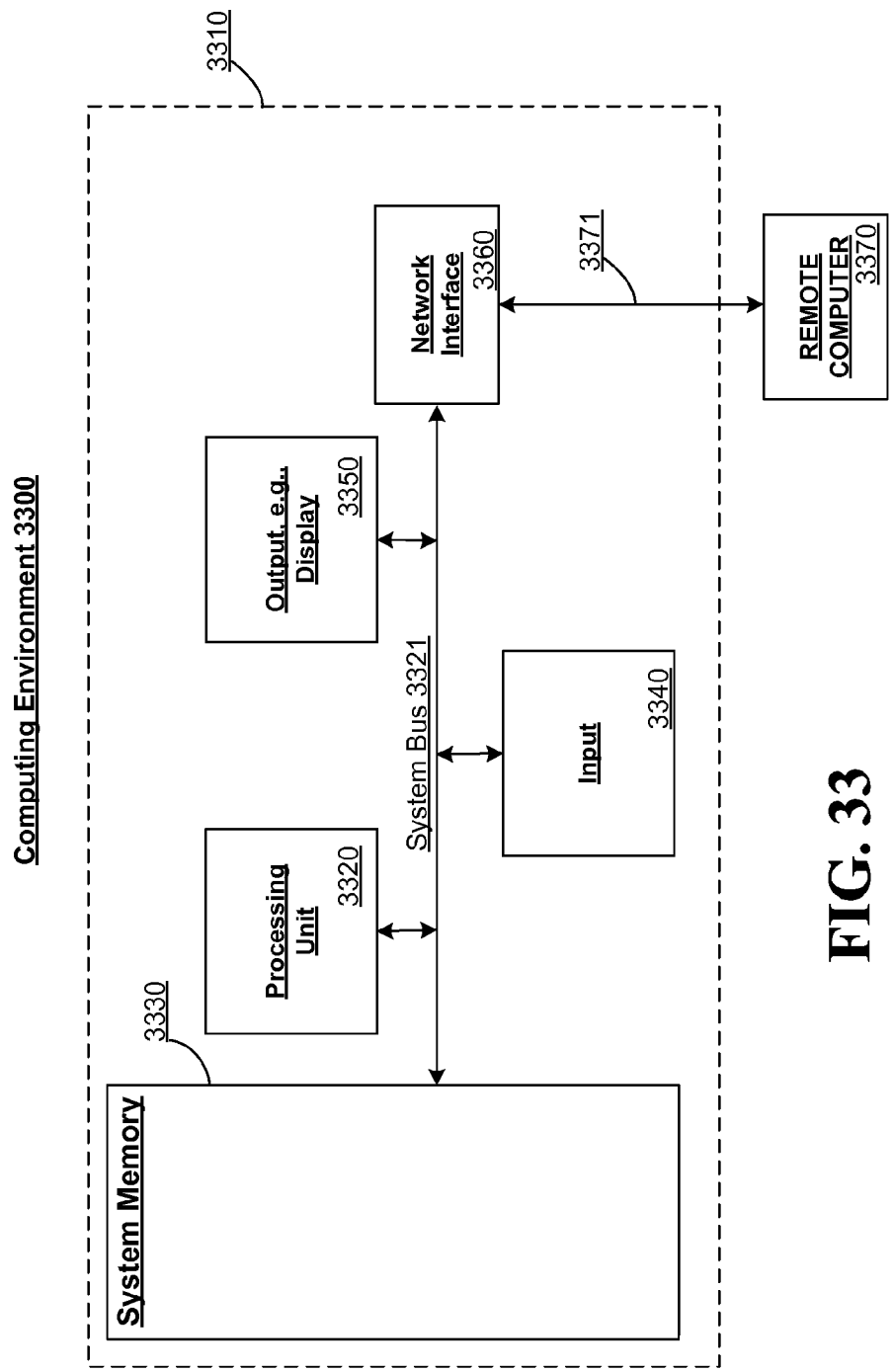
FIG. 33 is a block diagram representing an exemplary non-limiting computing system or operating environment in which one or more aspects of various embodiments described herein can be implemented.

FIG. 33 thus illustrates an example of a suitable computing system environment 3300 in which one or more of the embodiments may be implemented, although as made clear above, the computing system environment 3300 is only one example of a suitable computing environment and is not intended to suggest any limitation as to the scope of use or functionality of any of the embodiments. Neither should the computing environment 3300 be interpreted as having any dependency or requirement relating to any one or combination of components illustrated in the exemplary operating environment 3300.

With reference to FIG. 33, an exemplary remote device for implementing one or more embodiments herein can include a general purpose computing device in the form of a handheld computer 3310. Components of handheld computer 3310 may include, but are not limited to, a processing unit 3320, a system memory 3330, and a system bus 3321 that couples various system components including the system memory to the processing unit 3320.

Computer 3310 typically includes a variety of computer readable media and can be any available media that can be accessed by computer 3310. The system memory 3330 may include computer storage media in the form of volatile and/or nonvolatile memory such as read only memory (ROM) and/or random access memory (RAM). By way of example, and not limitation, memory 3330 may also include an operating system, application programs, other program modules, and program data.

A user may enter commands and information into the computer 3310 through input devices 3340 A monitor or other type of display device is also connected to the system bus 3321 via an interface, such as output interface 3350. In addition to a monitor, computers may also include other peripheral output devices such as speakers and a printer, which may be connected through output interface 3350.

The computer 3310 may operate in a networked or distributed environment using logical connections to one or more other remote computers, such as remote computer 3370. The remote computer 3370 may be a personal computer, a server, a router, a network PC, a peer device or other common network node, or any other remote media consumption or transmission device, and may include any or all of the elements described above relative to the computer 3310. The logical connections depicted in FIG. 33 include a network 3371, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to provide trust in connection with interactions with a cloud service.

There are multiple ways of implementing one or more of the embodiments described herein, e.g., an appropriate API, tool kit, driver code, operating system, control, standalone or downloadable software object, etc. which enables applications and services to use a trusted cloud services framework. Embodiments may be contemplated from the standpoint of an API (or other software object), as well as from a software or hardware object that provides pointing platform services in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating therefrom. Still further, one or more aspects of the above described embodiments may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for subscribing to data by distributing trust across multiple entities to avoid a single point of data compromise, the method comprising:
    requesting a subset of searchably encrypted data from a data storage provider by at least one subscriber device, wherein the searchably encrypted data provides for selective access to the subset of encrypted data based on search or query functionality without allowing access beyond the subset of encrypted data;
    receiving cryptographic key information from a key generation component that generates the cryptographic key information in response to the request for the subset of searchably encrypted data, the cryptographic key information based on identity information associated with the at least one subscriber device, wherein the cryptographic key information includes capability information that defines access privileges with respect to the searchably encrypted data, the capability information is late bound so that up to date access privileges are granted to a given subscriber and data accessible to the given subscriber changes dynamically consistent with changes to the access privileges by a publisher since subscriber capabilities are encoded in the cryptographic key information, the key generation component being independent and separate from the data storage provider;
    receiving the requested subset of searchably encrypted data;
    decrypting the subset of encrypted data using the cryptographic key information as allowed by capabilities defined in the cryptographic key information; and
    validating that a correct subset of encrypted data consistent with the requesting is received by the at least one subscriber device.

2. The method of claim 1, wherein the validating includes performing a proof of data possession to prove that the correct subset is received by the at least one subscriber device.

3. The method of claim 1, wherein the receiving includes receiving cryptographic key information from a key generation component executing in a separate region of control that generates the cryptographic key information based on at least one role determined from the identity information.

4. The method of claim 1, further comprising verifying content of the subset of encrypted data was not deleted or modified prior to receiving the subset of encrypted data.

5. The method of claim 4, wherein the verifying includes performing a proof of retrievability to prove lack of interference with the content.

6. The method of claim 1, wherein the cryptographic key information is further generated based on a keyword employed in the request for the subset of searchably encrypted data.

7. The method of claim 1, wherein the given subscriber subscribes to content of the subset of searchably encrypted data based on anonymous credentials.

8. A system for providing selective access to data by distributing trust across multiple entities to avoid a single point of data compromise, comprising:
    at least one data store configured to store selectively accessible encrypted data records wherein at least one subscriber requests a subscription to a subset of data records,
    a first independent entity configured to generate cryptographic key information in response to the request for the subset, the cryptographic key information is based on identity information associated with the at least one subscriber, wherein the cryptographic key information includes capability information that defines access privileges with respect to the selectively accessible encrypted data, the capability information is late bound so that up to date access privileges are granted to the at least one subscriber and data accessible to the at least one subscriber changes dynamically consistent with changes to the access privileges by a publisher since subscriber capabilities are encoded in the cryptographic key information, and
    a second independent entity configured to perform decrypting of the subset based on the cryptographic key information generated by the first independent entity wherein the selectively accessible encrypted data provides for selective access to the subset of encrypted data based on search or query functionality without allowing access beyond the subset of encrypted data; and
    at least one processor device configured to perform a network service, for handling at least one request by the at least one subscriber, that provides selective access to the subset of data records and validates that the subset is a correct subset consistent with the subscription.

9. The system of claim 8, wherein the cryptographic key information is further based on a keyword employed in the request for the subset of selectively accessible encrypted data.

10. The system of claim 8, wherein the at least one subscriber subscribes to content of the subset of selectively accessible encrypted data based on anonymous credentials.

11. A method for subscribing to data by distributing trust across multiple entities to avoid a single point of data compromise, the method comprising:
    requesting a subset of searchably encrypted data from a data storage provider from at least one subscriber device, wherein the searchably encrypted data provides for selective access to the subset of encrypted data based on search or query functionality without allowing access beyond the subset of encrypted data;

receiving cryptographic key information from a key generation component that generates the cryptographic key information in response to the request for the subset of searchably encrypted data, the cryptographic key information is based on identity information associated with the at least one subscriber device, wherein the cryptographic key information includes capability information that defines access privileges with respect to the searchably encrypted data, the capability information is late bound so that up to date access privileges are granted to a given subscriber and data accessible to the given subscriber changes dynamically consistent with changes to the access privileges by a publisher since subscriber capabilities are encoded in the cryptographic key information, the key generation component being independent and separate from the data storage provider;

receiving the requested subset of searchably encrypted data;

decrypting the subset of encrypted data using the cryptographic key information as allowed by capabilities defined in the cryptographic key information; and verifying content of the subset of encrypted data was not deleted or modified prior to being received by the at least one subscriber device.

12. The method of claim 11, wherein the verifying includes performing a proof of retrievability to prove lack of interference with the content.

13. The method of claim 11, wherein the receiving includes receiving cryptographic key information from a key generation component that generates the cryptographic key information based on at least one role determined from the identity information.

14. The method of claim 11, further comprising:
validating that a correct subset of encrypted data consistent with the requesting is received by the at least one subscriber device.

15. The method of claim 14, wherein the validating includes performing a proof of data possession to prove that the correct subset is received by the at least one subscriber device.

16. The method of claim 11, wherein the cryptographic key information is further based on a keyword employed in the request for the subset of searchably encrypted data.

17. The method of claim 11, wherein the given subscriber subscribes to content of the subset of searchably encrypted data based on anonymous credentials.

18. A system for providing selective access to data by distributing trust across multiple entities to avoid a single point of data compromise, comprising:
at least one data store configured to store selectively accessible encrypted data records wherein at least one subscriber device requests a subscription to a subset of data records, a first independent entity configured to generate cryptographic key information in response to the request for the subset, the cryptographic key information is based on identity information associated with the at least one subscriber device, wherein the cryptographic key information includes capability information that defines access privileges with respect to the selectively accessible encrypted data, the capability information is late bound so that up to date access privileges are granted to a given subscriber and data accessible to the given subscriber changes dynamically consistent with changes to the access privileges by a publisher since subscriber capabilities are encoded in the cryptographic key information, and a second independent entity configured to perform decrypting of the subset based on the cryptographic key information generated by the first independent entity wherein the selectively accessible encrypted data provides for selective access to the subset of encrypted data based on search or query functionality without allowing access beyond the subset of encrypted data; and at least one processor configured to perform a network service, for a request by the at least one subscriber device, that provides selective access to the subset of data records and verifies that the content of the data records in the subset has not been modified without permission.

19. The system of claim 18, wherein the cryptographic key information is further based on a keyword employed in the request for the subset of selectively accessible encrypted data.

20. The system of claim 18, wherein the given subscriber subscribes to content of the subset of selectively accessible encrypted data based on anonymous credentials.

21. A system for providing selective access to data by distributing trust across multiple entities to avoid a single point of data compromise, comprising:
at least one processor device associated with an entity of the multiple entities, the at least one processor device configured to generate cryptographic key information in response to a request by at least one subscriber for a subscription to a subset of data records from a data store configured to store selectively accessible encrypted data records, the cryptographic key information based on identity information associated with the at least one subscriber, the cryptographic key information including capability information that defines access privileges with respect to the selectively accessible encrypted data, the capability information late bound so that up to date access privileges are granted to the at least one subscriber and data accessible to the at least one subscriber changes dynamically consistent with changes to the access privileges by a publisher since subscriber capabilities are encoded in the cryptographic key information, the at least one processor device further configured to provide the generated cryptographic key information to a network service configured to handle the request by at least one subscriber, the network service further configured to provide selective access to the subset of data records.

* * * * *